United States Patent [19]

Sterlini

[11] 4,411,739
[45] Oct. 25, 1983

[54] PROCESS FOR THE RECTIFICATION OF BINARY LIQUID MIXTURES

[75] Inventor: Jacques Sterlini, Paris, France

[73] Assignee: Cie Electro Mecanique, France

[21] Appl. No.: 290,224

[22] Filed: Aug. 5, 1981

[30] Foreign Application Priority Data

Aug. 5, 1980 [FR] France .................... 80 17313

[51] Int. Cl.³ .............................................. B01D 3/14
[52] U.S. Cl. .................................... 203/24; 203/26
[58] Field of Search ............. 203/21, 24, 26, DIG. 4, 203/DIG. 8, 100; 62/26, 30

[56] References Cited

U.S. PATENT DOCUMENTS 3,992,167 11/1976 Beddome ........................ 62/26
4,315,802 2/1982 Tsao .

*Primary Examiner*—Frank Sever
*Attorney, Agent, or Firm*—Burns, Doane, Swecker and Mathis

[57] ABSTRACT

A process for the rectification of binary liquid mixtures is disclosed wherein one component of the mixture is more volatile than the other component. A rectification column is employed having rectification, intermediate and depletion stages, with a working fluid comprised of the components to be separated being employed to furnish energy for the rectification process.

5 Claims, 30 Drawing Figures

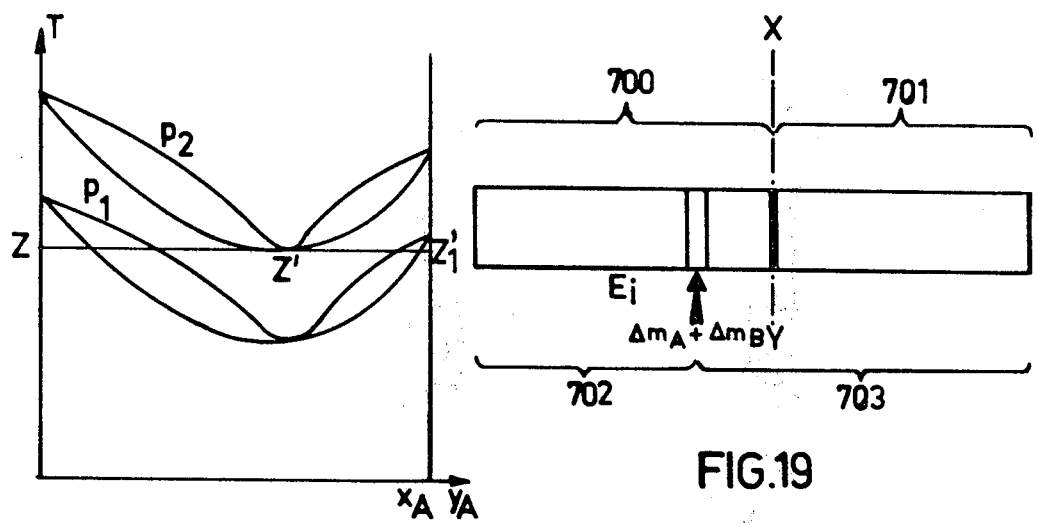
FIG.18
FIG.19
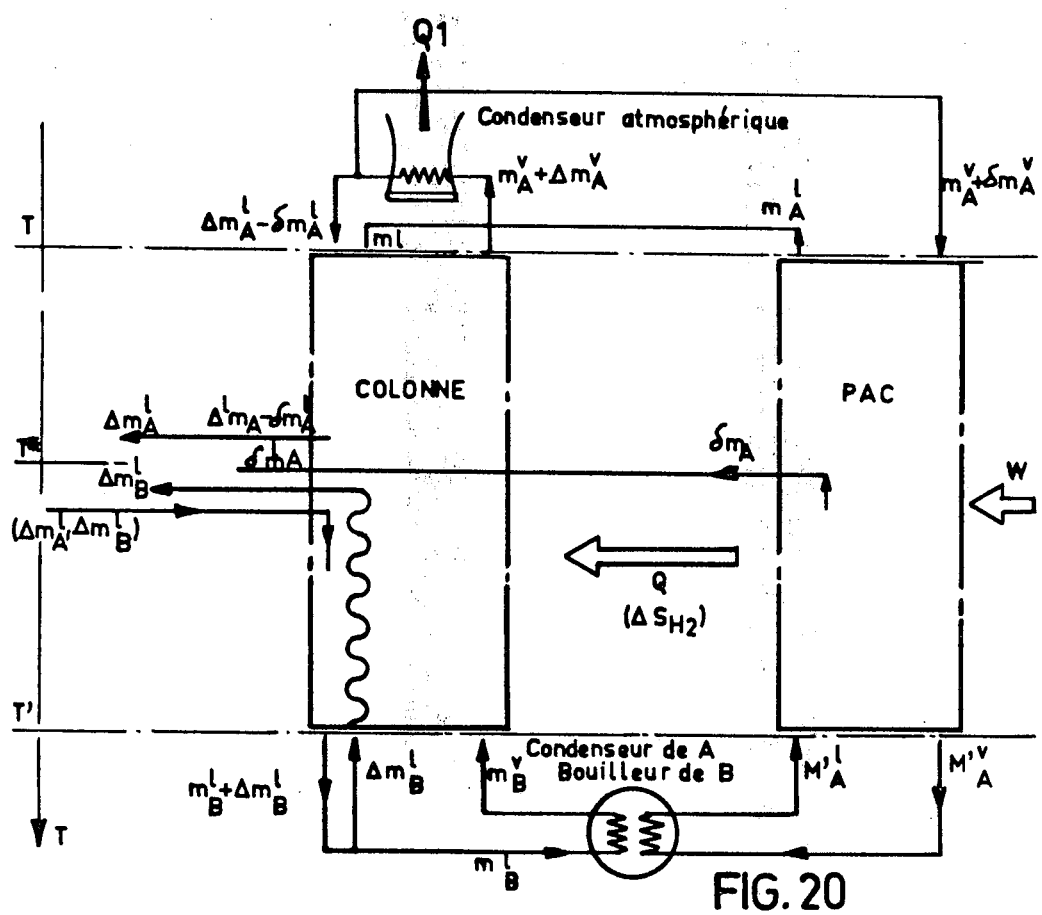
FIG.20

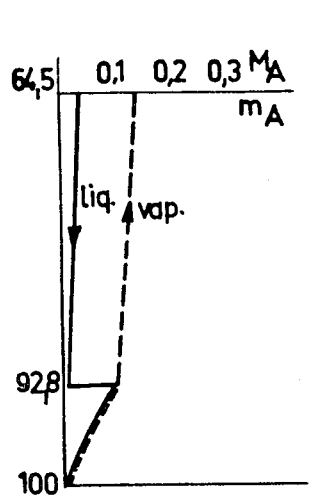
FIG.23a
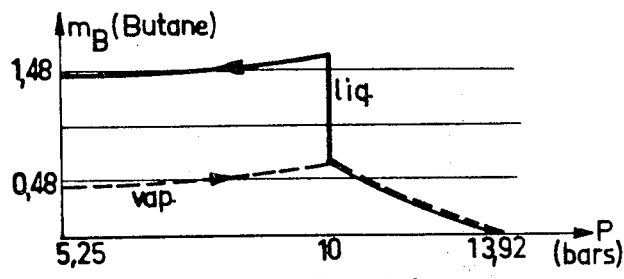
FIG.24a
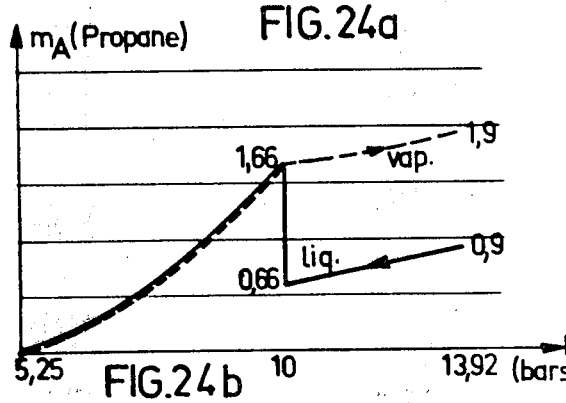
FIG.24b
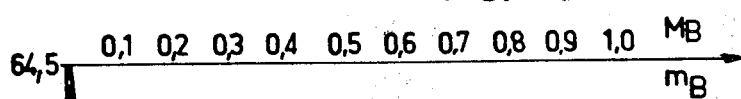
FIG.23b
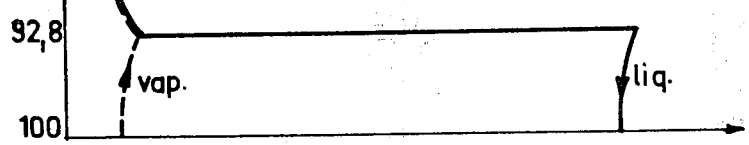
FIG.25a
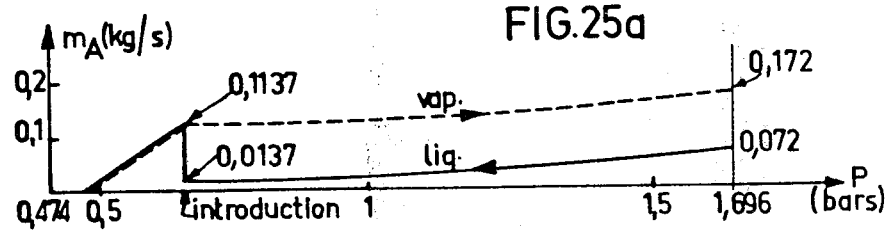

PROCESS FOR THE RECTIFICATION OF BINARY LIQUID MIXTURES

BACKGROUND OF THE INVENTION

The invention concerns the field of the rectification of liquid mixtures of two components having different boiling points.

The separation by distillation of the components of a binary liquid mixture is a well known and tested method. As a general bibliographical reference on this subject, for example, the work of S. G. SHINSKEY "Distillation control for production and energy conservation", McGraw-Hill, USA (1977), may be cited and is herein incorporated by reference.

It would certainly be useful to improve conventional rectification for the purpose of saving energy by trying to obtain better thermodynamic yields.

Rectification columns have already been equipped with heat pumps using as sources the condensers and the column boilers. These operations heretofore were limited to applications wherein the boiler temperatures did not exceed approximately 80° C., as the result of the temperature limitations imposed on the operation of heat pumps presently available on the market. Even when using working fluids providing higher performances with boiler temperatures exceeding 80° C. and attaining for example 120° C., only a small portion of existing columns may be thus equipped. Furthermore, the operations actually realized remain highly restricted in numbers, as the economics of their use do not permit rapid recovery of the investment. The performance of heat pumps (abbreviated PAC) are inadequate by reason of the limited thermodynamic yield of conventional materials. In the case under consideration, this yield is aggravated by the exchange temperature deviations due to the use of an intermediate heat transfer fluid between the "condenser-column"-"boiler-PAC" and "column boiler"-"PAC condenser".

The process according to the invention makes it possible both to avoid all temperature limitations and to employ the pumping of heat between the condenser and the boiler of the column with the best thermodynamic yield possible.

The invention takes advantage of a known process designated a "polytropic" process, which is employed in machines designated "polytropic". Such processes and machines are described particularly in French applications Nos. FR 74 114 38 (publication No. 23 07 227), FR 76 14 965 (publication No. 23 52 247) and FR 77 07 041, herein incorporated by reference.

Polytropic machines consist of a series of cells with staggered pressures/temperatures, wherein a working fluid circulates in the form of saturating vapor in contact with its liquid. Furthermore, there is or are present, at least in certain cells, one or several bundles of heating or cooling tubes, which expose the cells to heat transfer fluids introducing the heat of a producing source or extracting heat intended for a consuming zone. Finally, each cell is related to its neighbors, on the one hand, over the path of the vapor, by means of a compressor or a turbine, depending on whether the primary heat entering the process is available on the average at a high level of temperature or at a low level, the vapor ascending or descending the levels of pressures/temperatures thus involving a certain external work which may be designated the "work of transfer" and on the other hand, over the path of the liquid circulating in a direction inverse to that of the vapor and in an equal amount, through a calibrated orifice to descend the levels of pressures/temperatures or by means of a pump to ascend the said pressures/temperatures. It will be sufficient for those skilled in the art to refer to the descriptions of the abovecited patents in order to recognize the structure and functioning of such machines.

In the case wherein the heat transfer liquid introduces heat (it then circulates by traversing in series the stages in the direction of decreasing temperatures), the vapor of the working fluid is produced by the boiling of the liquid present in the cell, and, in the contrary case, the vapor of the working fluid condenses. Thus, the flow rates of the vapor and the liquid develop from stage to stage in accordance with the quantities of heat added or extracted as a function of the Q(T) law by which the addition or extraction of the heat are effected, i.e. as a function of the dimensions of the heat transfer bundles.

It is important to note that in principle, at the interface of two successive cells, the sum of the flow rates of the working fluid entering in the form of vapor or in the form of liquid is always equal to the sum of the flow rates of the same working fluid exciting in the form of liquid or the form of vapor, with the flows of the vapor and the liquid of the working fluid circulating in inverse directions within a stage always being equal.

It may be noted that the polytropic machines described in the above cited patents may be formed by four simple, elementary sequences, namely:

sequence of cooled compressors, used for a process of condensation with the absorption of work;

sequence of heated compressors, used in a process of boiling with the absorption of work;

sequence of cooled turbines used in a condensation process with work provided;

sequence of heated turbines, used in a boiling process with work provided.

All of these four elementary types of sequences comprise an open terminal stage whereby the liquid and vapor flows of the working fluid enter and exit, and a closed terminal stage wherein the working fluid is either completely vaporized, or completely condensed.

The table hereinafter indicates the side where the open stage may be found, the entries and exits of the working fluid in regard to the sequence considered, together with the direction of the heat transfer fluid.

| Type of Sequence | Open Stage | Working Fluid | Direction of the heat transfer fluid |
| --- | --- | --- | --- |
| Sequence of heated compressors | higher temperature | liquid enters, vapor exits | decreasing temperatures |
| Sequence of cooled compressors | lower temperatures | vapor enters, liquid exits | increasing temperatures |
| Sequence of heated turbines | lower temperatures | liquid enters, vapor exits | decreasing temperatures |
| Sequence of cooled turbines | higher temperatures | vapor enters, liquid exits | increasing temperatures |

In these systems, the heat transfer fluid may transverse several successive stages, or a single stage. In the extreme case, there may be a heat transfer circuit of a different nature per stage of a predetermined sequence.

It is also known that the operation of a polytropic machine may be generalized in the case wherein the liquid and vapor flow rates of the working fluid at the inlet of the open stage are different; in this case, the difference of the flows circulating in the two directions remains at a value it has at the inlet until the other terminal stage is reached, which is then traversed by a flow of the working fluid and thus is no longer a closed stage, it is said in such a case that one is in the presence of a "process open at both ends" or more simply an open process.

It is thus noted that the polytropic process that is the most general, has the following characteristics:

(1) It is multiple stage with regard to pressure and temperature.

(2) In each stage, the liquid and the vapor of the condensable working fluid are in contact and exchange both heat and material.

(3) The vapor of the working liquid circulates from stage to stage traversing rotating machines, thus involving work. The difference in temperature between two successive stages exists in principle only because of this single fact; the temperature rises from one stage to the other in the direction of the travel of the vapor if the rotating machine is a compressor, while it decreases if a turbine is involved.

(4) The liquid of the working fluid circulates from stage to stage in the direction inverse to the vapor; the liquid and vapor flows circulating between two stages have a difference which is reflected from stage to stage.

(5) Each stage may exchange heat with the outside.

The object of the present invention essentially is a process intended for the rectification of a binary mixture of two components A and B, A being more volatile, without the external addition of heat and providing only work, the latter being of a value close to the theoretical value necessary for the separation of the components A and B (designated the work of separation).

In the most general form, the object of the invention thus is a process for the rectification of a liquid mixture of two components A and B, A being the more volatile, wherein an open polytropic process using a condensable working fluid is utilized, said process comprising a plurality of stages, in each of which the liquid and the vapor of said working fluid are present, the flows of the vapor and the liquid of the working fluid circulating in inverse directions from one stage to the other, the difference berween the liquid and vapor flow rates of the working fluid circulating between two contiguous stages being conversed from stage to stage until the terminal stages; a process wherein, at the level of each stage, work and heat exchange with an external heat transfer fluid may be involved, said process being characterized in that the mixture of A+B to be rectified is used as the working fluid in the above-mentioned open polytropic process, said process being designated the principal process, with the terminal stages thereof being designated "first stage" and "last stage", so that one travels from the first to the last stage by following the direction of the travel of the vapor in said process, and comprising a pressure-temperature distribution such that in the first stage there is found only the component B in a practically pure state and in the last stage only a practically pure A component, in that in the stage wherein the liquid concentration is closest to that of the mixture, the charge to be rectified is introduced, it being a mixture composed of a flow $\Delta m_A$ of component A and $\Delta m_B$ of component B, previously brought to the pressure-temperature of said stage, designated the feed stage, the stages proceeding from the increasing direction from the feed stage to the last stage, being called the rectification stages and constituting together a rectification module, the difference of the vapor and liquid flows of the B component being essentially zero in the rectification module, while the difference of the vapor and liquid flows of the A component is equal to $\Delta m_A$ and is reproduced from stage to stage in the rectification module to the last stage, where a vapor flow $\Delta m_A$ is recovered, together with a supplemental vapor flow $m_A^*$, by that the same flow $m_A^*$ is reinjected, after condensation, in the last stage to constitute the reflux of A, the stages proceeding in the decreasing direction from the feed stage to the first stage being designated the depletion stages and constituting together a depletion module, the difference of the vapor and liquid flows of the component A in the depletion module being essentially zero, while the difference of the vapor and liquid flows of the component B is equal to $\Delta m_B$ and is reproduced from stage to stage in the depletion module until the first stage, wherein a liquid flow $\Delta m_B$, accompanied by a supplemental liquid flow $m_B^*$, is recovered, by that the same flow $m_B^*$ is reinjected, after vaporization, in the first stage to constitute the reflux of B, with the vapor flow $\Delta m_A$ in the last stage and the liquid flow $\Delta m_B$ in the first stage constituting the production.

BRIEF DESCRIPTION OF THE DRAWINGS

The description hereinafter refers to the drawings attached hereto, wherein:

FIG. 18 is a theoretical diagram similar to that of FIGS. 1 and 2 and showing variants of the invention;

FIG. 19 is a scheme illustrating the process of the invention for the separation of an azeotropic mixture;

FIG. 20 is a diagram based on FIG. 14 and intended to illustrate the calculations performed according to the invention;

FIGS. 23a and 23b are graphics established for methanol and water with an isobaric principal process;

FIGS. 24a and 24b are graphic representations established for isobutane and propane with an isothermal principal process;

FIGS. 25a and 25b are graphic representations established for methanol and water with an isothermal principal process;

DETAILED DESCRIPTION OF THE INVENTION

Figure 1:
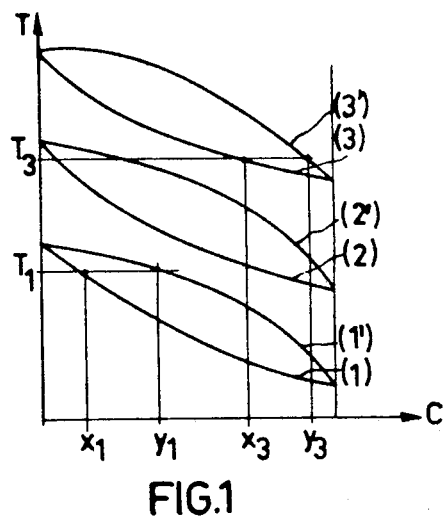
FIG. 1 is a known equilibrium diagram for binary mixtures.

In order to illustrate the invention, it is initially convenient to refer to the known pressure-temperature equilibrium curves, which are functions of the vapor and liquid concentrations of the A-B mixture. These curves are shown in FIG. 1 for a mixture with a behavior close to that of ideal solutions; the well known zone curves established for the pressures $P_1$, $P_2$, $P_3$ with $P_1 < P_2 < P_3$ may be seen therein, where the temperatures T are represented as functions of the concentrations c of the body A, liquid and vapor; the curves (1), (2), (3) of FIG. 1 are relative to the liquid concentrations, the curves (1'), (2'), (3') are relative to the vapor concentrations, respectively, for the pressures $p_1$, $p_2$, $p_3$.

According to a characteristic of the invention, a polytropic machine is operated with a mixture of the components A, B as the working fluid.

Pressures and temperatures are established in the sequence of stages of the machine such as:

$$|P_A, T_A|, |P_B, T_B|, -|P_i, T_i|-|p_n, T_n|,$$

and variable concentration couples of the liquid (x) and the vapor (y), such as:

$$|x_A, y_A|, |x_B y_B|, -|X_i, y_i|-|x_n, y_n|,$$

corresponding to an enrichment in one of the components and a depletion in the other component when passing from the first to the last stage.

As an example, with a sequence of heated compressors, in the first and last the conditions represented in FIG. 1 may be obtained: first stage at $p_1$, $T_1$ liquid and vapor concentrations: $x_1$ and $y_1$, last stage at $p_3 T_3$, liquid and vapor concentrations: $x_3$ and $y_3$.

The theory of polytropic machines further indicates that it is possible by varying the velocity of the compressors and the distribution of heat additions at the different stages, to ensure that the conditions established in the first and the last stages yield concentrations corresponding respectively to pure A and B components.

The conditions of pressure-temperature that are established between the successive stages of polytropic machines thus render it possible to obtain enrichments in A and in B respectively, by turning toward one of the other of the ends of the machine, to pass from the pure B component to the pure A component.

According to the invention, the process is fed with a mixture of $\Delta m_A + \Delta m_B$ designated "the charge", by introducing it in a median stage of the polytropic machine and at the ends of said machine, pure flows of $\Delta m_A$ and pure $\Delta m_B$ are recovered.

Thus, a polytropic machine fed at the level of a stage by a mixture $\Delta m_A + \Delta m_B$, comprises a combination of three parts:

the feed stage (or intermediate stage);
the rectification module or stage; and
the depletion module or stage In these three parts, the vapor and liquid flows circulating between two successive stages having different structures.

In the rectification module, the flows of B vapor and liquid are essentially identical and the difference in the flows of A vapor and liquid amounts to $\Delta m_A$.

In the depletion module, the A flows are essentially identical in the vapor and the liquid; the difference in the flows of the B liquid and vapor amounts to $\Delta m_B$.

The feed stage receives the charge $\Delta m_A + \Delta m_B$, the vapor coming from this stage is directed to a terminal stage of the rectification module, in the inverse direction, the liquid entering the feed stage comes from the same terminal stage; the structure of these vapor and liquid flows is that of the rectification module. Similarly, the vapor entering the feed stage originates in a terminal stage of the depletion module; in the inverse direction, the liquid flow introduced in the depletion module originates in the feed stage; the structure of these vapor and liquid flows is that of the depletion module.

The vapor and liquid effluents are in equilibrium in each stage by means of direct contact (See FIG. 1) and in view of the pressure-temperature conditions prevailing in the stage under consideration, the effluents leaving this stage are in a state corresponding to this equilibrium. There are thus relationships between the flows circulating between successive stages, the values of $\Delta m_A$ and $\Delta m_B$ and the concentrations in these stages corresponding to the pressures-temperatures prevailing therein.

In the rectification module, between two successive stages of the order of i and i+1, the following relationship exists:

$$\frac{M_A}{\Delta m_A} = \frac{y_{Ai}(1 - x_{Ai} + 1)}{y_{Ai} - X_{Ai} + 1} \tag{a}$$

wherein $M_A$ = vapor flow
$\Delta m_A$ = charge flow in the component A
$x_{Ai}+1$ = concentration of liquid A in the stage i+1
$y_{Ai}$ = vapor concentration of A in the range i In the depletion module between two successive stages of rank j and j+1, the following relationships prevail:

$$\frac{M_B}{\Delta m_B} = \frac{x_{Bj} + 1(1 - y_{Bj})}{x_{Bj} + 1 - y_{Bj}} \quad \text{(b)}$$

wherein
- $M_B$ = liquid flow
- $\Delta m_B$ = flow of charge in the component B
- $x_{Bj}+1$ = liquid concentration of B in the stage of rank $j+1$.
- $y_{Bj}$ = vapor concentration of B in the stage of rank j.

By applying the two relations (a) and (b) at the level of the feed stage, on the side of the depletion module and the side of the feed module, it is seen that the concentration established in said feed stage is the same as in the charge.

By applying the relations (a) and (b) to the rectification module at the level of the terminal stage noncontiguous with the feed stage and designated the "last stage", it is seen that there issues from said stage a flow $M_A^*$ of the vapor of A, so that $M_A^* > \Delta m_A$, with the difference $M_A^* - \Delta m_A$ constituting a supplemental flow which, in keeping with the rules of the operation of polytropic machines, should be reintroduced in the vapor state in the same stage; this flow is designated "reflux of A".

By applying the relations (a) and (b) to the depletion module at the level of the terminal stage noncontiguous with the feed stage and designated the "first stage", it is seen that there issues from said stage a flow $M_B^*$ of the vapor of B, so that $M_B^* > \Delta m_B$, with the difference $M_B^* - \Delta m_B$ constituting a supplemental flow which, in keeping with the rules of the operation of polytropic machines, should be reintroduced in the vapor state in the same stage; this flow is designated "reflux of B".

According to the characteristic complementary dispositions of the process according to the invention, the process of separation is combined with three other processes with which it exchanges heat in the form of the latent heat of the component A.

The first of these processes, designated associated processes, has as its object the exchange of heat with the binary fluid (A, B) in the different stages of the separation process, so that the heat is transferred to the vaporizing binary fluid, by the condensing A vapor and that it is removed from the binary fluid during condensation to be supplied to the vaporizing liquid A component.

According to the invention, the heat for the exchanges is supplied by the flow of the vapor A escaping from the last stage of the separation process, said vapor carrying the latent heat of a flow comprising both the production $\Delta m_A$ and the reflux of A. The heat requirement of the separation process is equal to the heat of evaporation of the "production flow $\Delta m_A$ and the reflux of A", reduced by the heat of condensation of the reflux vapor of B; the total addition of heat in the separation process is thus in excess, with respect to the requirements, by a quantity equal to the heat of condensation of the reflux of B increased by the work applied to the system and the thermodynamic irreversibilities; it is seen therefore that the flow of A exiting from the associated process still carries this excess heat in the form of the latent heat of its vapor.

The flow of A is then introduced in the second process which is a boiler process of the supplemental liquid flow of B, the vapor of B produced in this manner constitutes the flow of the reflux vapor of B.

The exiting flow of A again carries a latent heat slightly higher than the work supplied to the system; it is thus necessary to condense a flow of the vapor of A in a third process, designated the condensation process of A and evacuating the excess heat to the outside. According to the invention, the process is interposed in the vapor circuit of A connected with the terminal process at a lower temperature level of the associated process.

According to the complementary characteristics of the process of the invention, measures are taken so that the exchanges described hereinabove are effected in conditions that are as close as possible to reversibility. The description hereinafter, with reference to FIG. 2, illustrates these characteristics.

Figure 2:
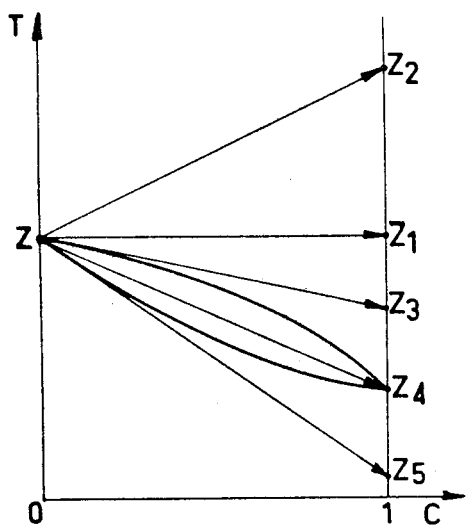
FIG. 2 is a simplified diagram, similar to that of FIG. 1, demonstrating different variants of the process of the invention.

FIG. 2 is a diagram similar to that of FIG. 1, wherein the vapor and liquid concentrations are represented at equilibrium as functions of pressure and temperature; this diagram makes it possible to demonstrate the representative paths of evolution possible in the successive stages of a separation process. The representative point of the first stage of this process is always the point Z; the points $Z_1$, $Z_2$,—etc. $Z_5$ are representative of the last stage; the path $ZZ_1$ is at an increasing pressure and is isothermal; the path $ZZ_2$ is at increasing pressure and an increasing temperature; the path $ZZ_3$ is at increasing pressure and decreasing temperature; the path $ZZ_4$ is at constant pressure and a declining temperature. The path $ZZ_5$ is at a decreasing pressure and temperature.

The characteristic dispositions of the process according to the invention are applicable to all cases.

In the path $ZZ_1$, the separation process is isothermal; the exchanges between the binary fluid and the component A are effected in the exchangers; the deviation of the exchange temperature between the vapor of A and the binary fluid is obtained by compressing said vapor of A prior to its introduction of the exchangers; the temperature difference to be established between the liquid A and the binary fluid is obtained by means of a "flash" expansion of the condensate of A.

Figure 3:
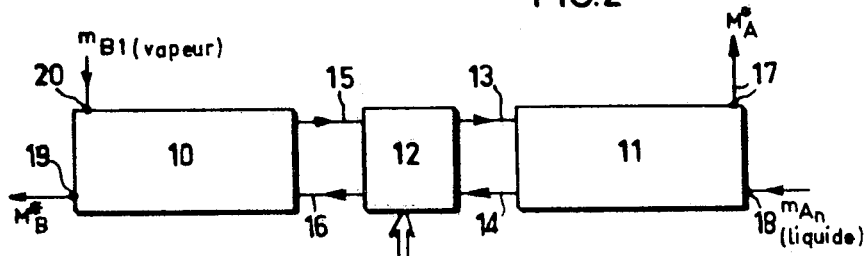
FIG. 3 is a scheme illustrating the embodiment of the process of the invention.

In FIG. 3, an illustrative system for the embodiment of the process of the invention in the case of the isothermal path $ZZ_1$ is shown. In such a process, the entirety of the stages is essentially at the same temperature. It is seen in FIG. 3 that the system comprises essentially a depletion module 10, a rectification module 11 and a stage 12 of the introduction of the mixture $\Delta m_A + \Delta m_B$.

The introductory stage 12 is related to the rectification module by means of tubes 13 (vapor) and 14 (liquid) and to the depletion module 10 by means of the tubes 15 (vapor) and 16 (liquid).

In the rectification module 11, the vapor of B is progressively condensed so that only an essentially pure component A remains, both in the vapor and the liquid at the level of the last stage; the enrichment of the mixture (both vapor and liquid) results equally from the vaporization of A; if in a stage the heat produced by the condensation of B is carried over to the vaporization of A, the stage is exothermic; in the rectification module 11, certain stages may be exothermic in principle, the others being endothermic; in practice, the rectification module 11 is almost always exothermic in all of its stages. From the last stage (index n) of the module 11, there issues at 17 a flow $M_A^*$ of the pure A componant in the vapor state, with $M_A^* = \Delta m_A + m_{An}$, $m_{An}$ being the supplemental flow introduced into the same stage in the liquid state at 18.

In the depletion module 10, the titer of the componant B, both liquid and vapor, increases constantly when moving from the stage 12 of the introduction toward the first stage. At the level of the first stage, a flow $M_B^*$ of the pure component B exits, in 19 with $M_B^* = m_{B1} + \Delta m_B$, $m_{B1}$ being the supplemental flow introduced in the vapor state at 20. In all of the stages of the module 10, A and B are being vaporized simultaneously. Thus, the depletion module 10 is endothermic at the level of all of its stages. It is evident that when one speaks in the present description of an essentially pure component A, said component A is in a state of controlled purity, which may attain the maximum purity attainable in an industrial operation.

Figure 4:
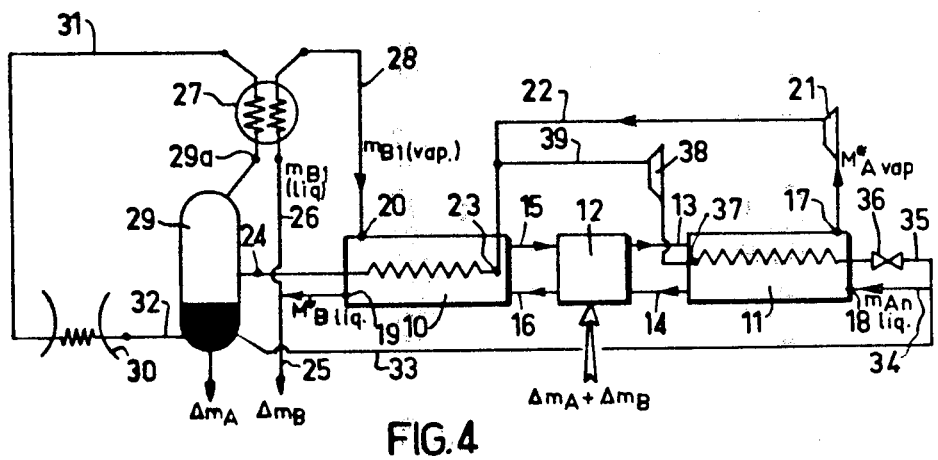
FIG. 4 is an isothermal system for the embodiment of the process of the invention.

In FIG. 4, an isothermal system of the type illustrated schematically in FIG. 3, is shown, it comprises means to condense the flow $M_{An}$, means to vaporize the flow $m_{B1}$, together with means to maintain the modules 10 and 11 at a constant temperature.

Let us suppose, in a nonlimiting manner, that the rectification module 11 is exothermic; the depletion module 10 is always endothermic. The cases wherein the module 11 is entirely or partly endothermic is part of general knowledge and is within the range of those skilled in the art.

In FIG. 4, similar elements or means are designated by the same signs or codes of reference as in FIG. 3.

The flow $M_A^*$ exiting at 17 from the rectification module 11 is compressed in at least one compressor 21 prior to its introduction at 23 through the line 22 in the depletion module 10. The temperature of the condensation of the vapor $M_A^*$ rises, thereby generating the exchange $\Delta T$. The flow then traverses the module 10 (path 23–24), while partially condensing; measures are taken at the level of the exchangers (condensers of A, boiler of the mixture A, B) to maintain the temperature deviation $\Delta T$ essentially constant; the depletion module 10 is thus mostly at a constant temperature. The two-phase mixture of A subsequently arrives in an area 29, where the vapor and liquid are separated.

On its part, the liquid flow $M_B^*$ exiting at 19 from the module 10 is separated into two parts:

the flow $\Delta m_B$, which is collected in the line 25 and which constitutes the production of B;

the flow $m_{B1}$ which is transported through the conduit 26 and which is made to traverse the exchanger 27. After passing through the exchanger 27, the flow $m_{B1}$, in the form of vapor, is reintroduced in the module 10 at 20. The exchange fluid in the exchanger 27 is the vapor of A. The exchanger 27 is thus a condenser of A and a boiler of B. For this purpose, the vapor of A coming from the area 29 is transported through the line 29a, traverses the exchanger 27 and then circulates in the line 31.

The flow $m_{B1}$ is evaporated in its entirety in the course of its passage through the exchanger 27, prior to being introduced through the line 28, in the form of vapor in the first stage of the module 10 at 20.

The flow of A coming from the exchanger 27 through the line 31, is not completely condensed; it is then passed into the atmospheric condenser 30, from which it emerges completely liquid. It is transported in the conduit 32 to be introduced in the area 29, which is the general reserve of liquid A at the isothermal operating temperature of the system.

From the reserve 29, a liquid flow is extracted, a part $m_{An}$ of which is returned through the tubing 33, 34 to 18 in the rectification module 11, while the other part passes through the tubing 33, 35, while traversing a laminar flash valve 36, which has the purpose of dropping its temperature of $\Delta T'$ below the temperature of the system, thereby creating the temperature difference of the exchange. The flow of A traverses the rectification module 11 at y, while taking up the heat and becoming vaporized; the vapor of A produced in 37 is then compressed in 38 to be combined through the line 39 the vapor circuit effected by the line 22.

Figure 5:
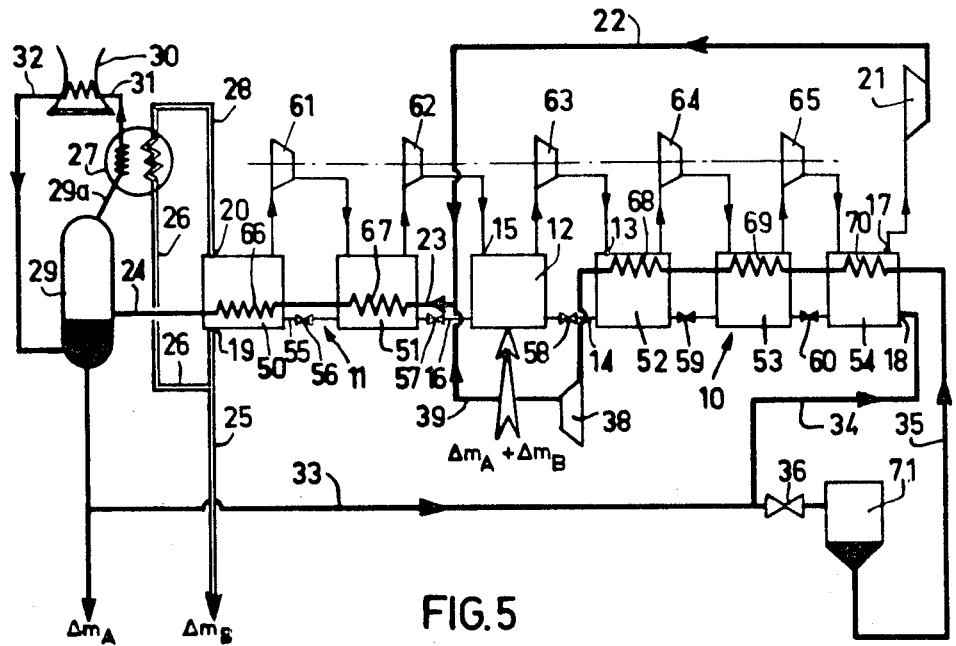
FIG. 5 is a complete device employing the means represented in FIGS. 3 and 4.

As an illustration, in FIG. 5 a device using the means shown in FIGS. 3 and 4 is shown. In the example chosen, the depletion module 11 comprises two stages or cells 50, 51 and the rectification module 10 comprises three stages or cells 52, 53, 54. The introduction stage is designated by the reference 12, as in FIGS. 3 and 4.

In the module 11, the exchange cells 50 and 51 are connected by a tube 55 with the throttling flash valve 56. Between the stage 12 and stage 51 there is also provided a valve 57 in the tube 16. Similarly, between the stages of the rectification module 10, throttling means (valves) are provided in the path of the vapor, respectively 58 in the tube 14 between stage 12 and stage 52, a valve 59 between the stages 52 and 53 and a valve 60 between the stages 53 and 54. In a known manner, compressors are associated with the different stages. Thus, a compressor 61 is provided between the stages 50 and 51, a compressor 62 between the stages 51 and 52, a compressor 63 between the stages 12 and 52, a compressor 64 between the stages 52 and 53 and a compressor 65 between the stages 53 and 54. The paths of the vapors between the different stages and the corresponding compressors are indicated by the fine lines and by the arrows.

The compressor 21 is provided at the outlet 17 of the module 10 as already shown in FIGS. 3 and 4.

The paths of the liquid are shown by bold lines.

The exchange circuits in the stages 50 and 51 of the module 11 are designated respectively by the references 66 and 67. The exchange circuits in the stages 52, 53 and 54 of the module 10 are designated respecttively by the references 68, 69 and 70.

The same elements as in FIGS. 3 and 4 are found in FIG. 5, designated by the same references. There is, therefore, no need to describe them again, their function having been already illustrated. An additional buffer reservoir 71 is further shown, mounted on the line 35 and feeding the last stage of the module 11. FIG. 5 corresponds to an actual embodiment of an isothermal system operating according to the theoretical curve $ZZ_1$ of the graphical representation of FIG. 2.

For non-isothermal polytropic systems, the process of separation takes place at staggered temperatures. The assembly diagram of the system is identical with that of FIG. 3, but in this case the successive states encountered by moving from the first stage toward the last one correspond on the diagram of FIG. 2 (liquid-vapor equilibrium diagram) to the paths $ZZ_2$, $ZZ_3$, $ZZ_4$ and $ZZ_5$. The paths are shown in FIG. 2 by following the liquid states, but it is obvious to those skilled in the art that the vapor state may be derived at any point read on the path, from the homologous curve representing the vapor state at the same temperature.

On all of the paths other than the isothermal path $ZZ_1$, the separation process takes place at staggered temperatures. The associated process is a polytropic process comprising the same number of processes as the separation process, the stages of the same rank being homologous in the two processes, which the stages designated "first" and "last" of the associated process being homologues of the stage of the same name of the separation process and each stage of rank i exchanging heat at a temperature Ti with its homologue of the associated process at a temperature $T'_i$, the temperature difference $T_i-T'_i$ being positive when the behavior of binary fluid exchange is condensing and negative if it is boiling.

It will now be shown how the different characteristics define the operation of the systems by means of the different paths of FIG. 2, other than the isothermal path $ZZ_1$.

It will now be shown by what means $M_A^*$ is condensed, $M_{B1}$ is evaporated and how the successive temperatures of the stages are maintained at the values specified by the paths envisioned. The description hereinafter is prepared, for the sake of simplicity, for the case of an ideal machine.

As mentioned hereinabove, the system according to the invention consists essentially of the association of the polytropic separation process, designated the principal process, with another polytropic process operating with the component A as the working fluid, to be designated the associated process. The associated process comprises the same number of stages as the principal process; the successive stages of the two processes being homologous in the association considered, with two homologous stages exchanging heat so as to be at the same temperature (or at least to maintain at an adequate value their temperature difference, which is the deviation of the exchange temperature).

Figure 6:
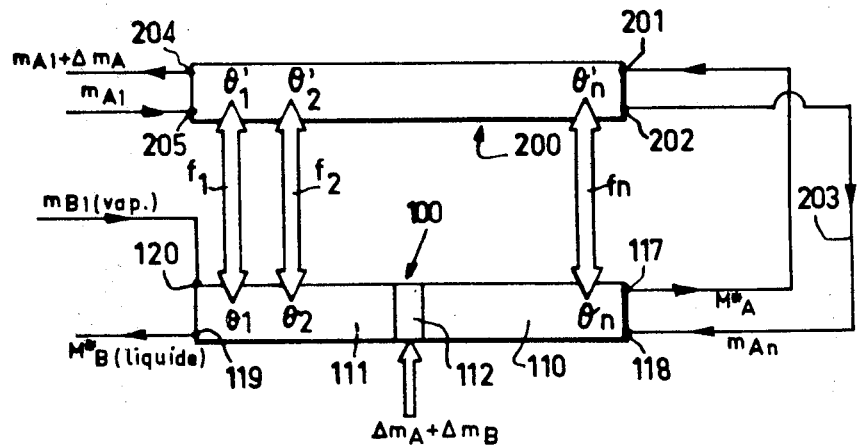
FIG. 6 is a theoretical scheme illustrating the combination of a principal process and an associated process.

FIG. 6 is a theoretical scheme illustrating the combination, according to the invention, of a principal process and an associated process. The principal process is illustrated by the bock 100, with its rectification module 110, its depletion module 111 and its stage 112 for the introduction of the charge $\Delta m_A + \Delta m_B$.

The associated process is represented by the block 200. As seen in FIG. 3, the principal process 100 provides at 117 (last stage of the rectification module) a flow $M_A^*$ of vapor, with $M_A^* = m_{An} + \Delta m_A$, while the flow $m_{An}$ is reintroduced at 118. A liquid flow $M_B^*$ further exits from the first stage of the depletion module at 119 and a (vapor) flow $m_{B1}$ is introduced at 120. According to the invention, the flow $M_A^*$ exiting at 117 of the process 100 is introduced at 201 into the associated process 200. This same process is to restitute at 202 a liquid flow equal to $m_{An}$, this flow then being transported through the conduit 203 to be introduced at 118. The difference in the vapor and liquid flows at the ends 201, 202 of the process 200 may be written as $M_A^* - m_{An} = \Delta m_{An}$.

At the other end of the process 200, at 204 a vapor flow $m_{A1} + \Delta m_A$ exits and at 205 a liquid flow $m_{A1}$ enters. For the sake of clarity, in FIG. 6 only the circulation of the fluid A is shown. Similarly, the correspondence between the respective stages of the principal process 110 and the associated process 200 is indicated schematically by the arrows $f_1$, $f_2$ —$f_n$, with the correspondence of the temperature levels at each stage being illustrated by the temperatures $\theta_1 \leftrightarrow \theta_1'$, $\theta_2 \leftrightarrow \theta_2' - \theta_n \leftrightarrow \theta_n'$.

Figure 7:
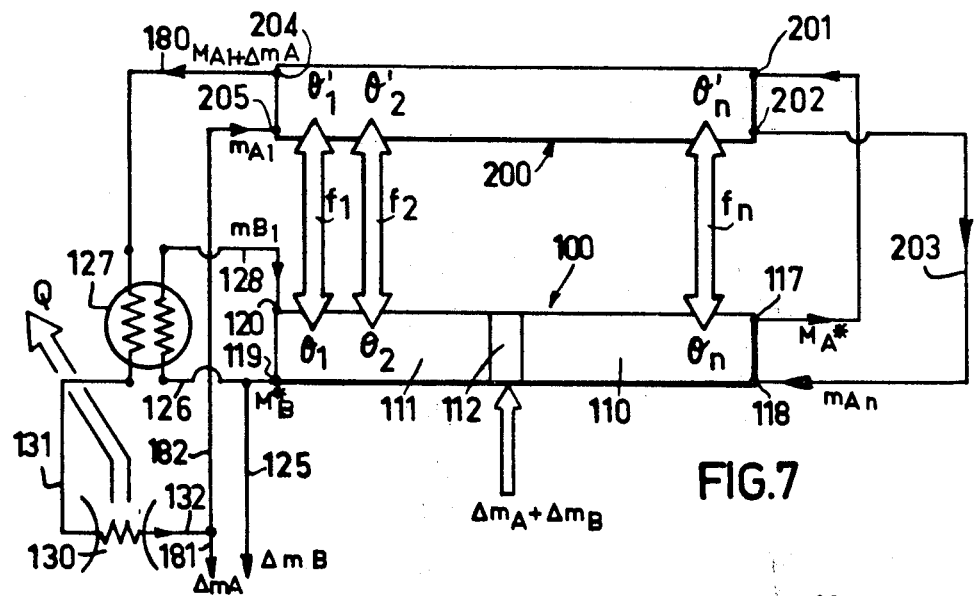
FIG. 7 is a more complete scheme employing the means represented in FIG. 6.

In FIG. 7 the schematic representation of the Figure is completed by adding the liquid B and other elements necessary for the heat exchanges in the system. At the left side of FIG. 7, there is seen an exchanger 127 wherein the component A coming from the outlet 204 of the associated process 200 through the line 180 is circulating on the one hand, and on the other some of the component B coming from the outlet 119 of the principal process 100, through the line 126. The component A traverses the exchanger 127 while condensing partially and is recovered in the conduit 131. The quantity $m_{B1}$ of the component B passing through the exchanger 127 evaporates totally therein and exits by the line 128 to be introduced in the principal process at 120.

Further, an atmospheric condenser 130 is seen, wherein the two-phase flow of the component A is transported by the conduit 131, said flow exiting from the exchanger 127. The vapor of component A condenses completely therein. In the outlet conduit 132, there is recovered on the one hand the production $\Delta m_A$ of the component A (line 181) and on the other, the flow $m_{A1}$, which is reintroduced through the conduit 182 at the inlet 205 of the associated process 200. The arrow $Q'$ indicates the heat rejection of the system. The production $\Delta m_B$ is recovered in the line 125.

The dispositions described with reference to FIG. 7 are suitable if in the principal process 100, the temperature $\theta_1$ in the first stage is less than $\theta_n$ of the last stage, i.e. if the process 100 is at a rising temperature: the reject heat $Q'$ is evacuated into the atmosphere at the lowest temperature of the process. In the contrary case, i.e. when the low level temperature is at the side of the last stage of the process 200, the disposition shown in FIG. 8 must be adopted.

Figure 8:
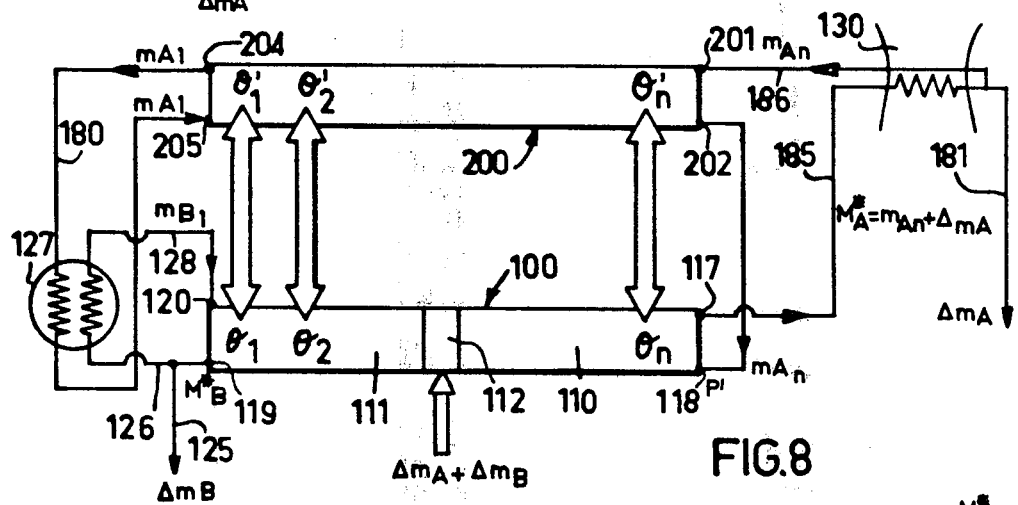
FIG. 8 is a scheme similar to that of FIG. 7, in a variant of embodiment.

The elements common to FIGS. 7 and 8 carry the same reference symbols. It is seen in FIG. 8 that the component A (vapor flow $m_{A1}$) coming from the outlet 204 of the associated process 200 passes through the conduit 180, traverses the exchanger 127 and is recycled (liquid flow $m_{A1}$) to the inlet 205 of the same process 200. The fluid B of the exchange is, as in FIG. 7, taken at the outlet 199 (flow $M^*_B$) of the principal process 100, passes, following the removal of the production $\Delta m_B$ of B in the conduit 125, into the conduit 126 and traverses the exchanger 127 while evaporating completely, to be returned (vapor flow $m_{B1}$) through the line 128 to the inlet 120 of the process 100.

The atmospheric condenser 130, located at the right side of the drawing in FIG. 8, receives through the conduit 185 the total flow of A, or $M^*_A = m_{An} + \Delta m_A$, coming at 117 of the principal process 100. At the outlet of the condenser 130, at 181 the production $\Delta m_A$ of A is recovered and a flow $m_{An}$ is returned through the conduit 186 to the end 201 of the associated process 200.

The systems corresponding in a precise manner to the paths $ZZ_2$, $ZZ_3$, $ZZ_4$, and $ZZ_5$ shall now be desscribed and illustrated (FIG. 2). Briefly, these paths correspond to the following situations for a polytropic separation machine using the principal polytropic process:

path $ZZ_2$ = machine with compressors, cooled, at rising temperatures;
path $ZZ_3$ = machine with compressors, heated, at decreasing temperatures;
path $ZZ_4$ = isobaric machine (case of the conventional distillation column), at decreasing temperatures;
path $ZZ_5$ = machine with turbines, heated, at decreasing temperatures.

The systems corresponding to these different paths shall be described separately.

PATH $ZZ_2$

The principal process is at pressures and temperatures rising from the first to the last stage; the associated process is a turbine process; the process of the condensation of A is interposed in the vapor circuit of A exiting from the first stage of the associated process, in series with the boiling process of B; the flow of A exiting from the two processes is liquid and the production $\Delta m_A$ of A may be taken from them; the rest is returned to the first stage of the associated process. The difference between the vapor flow of A coming from the first stage of the associated process and the liquid flow of A entering therein is thus $\Delta m_A$; according to the polytropic invention, this difference is well maintained to the last stage of said process. In effect, the latter receives the entirety of the flow coming from the separation process and evacuates only the supplemental flow ($m_A$) of the liquid component A. The difference thus is $\Delta m_A$, which is the production of A.

Figure 9:
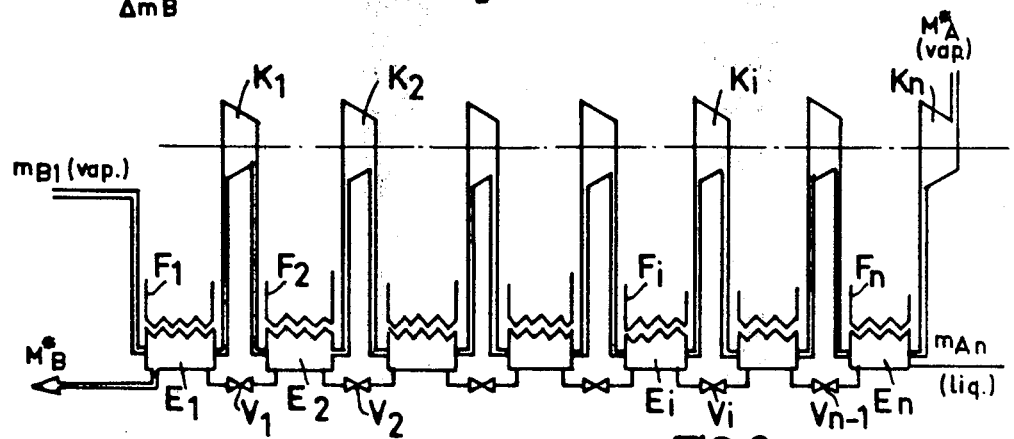
FIG. 9 illustrates the principal polytropic machine used according to the invention in the system of FIG. 11.
Figure 10:
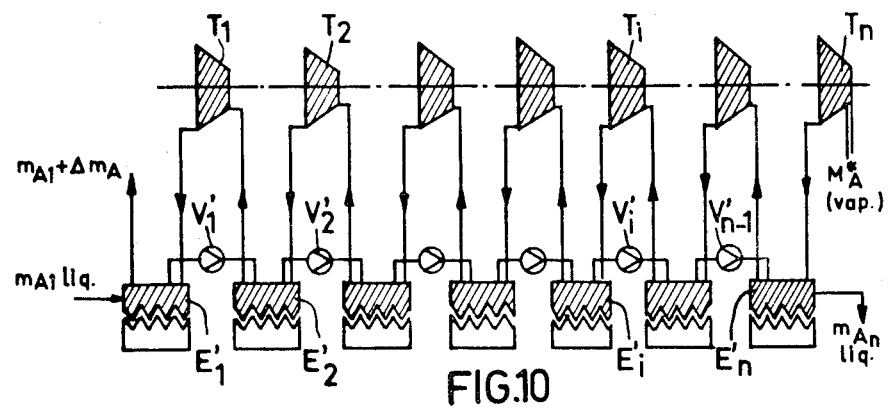
FIG. 10 illustrates the associated polytropic machine used according to the invention in the system of FIG. 11.
Figure 11:
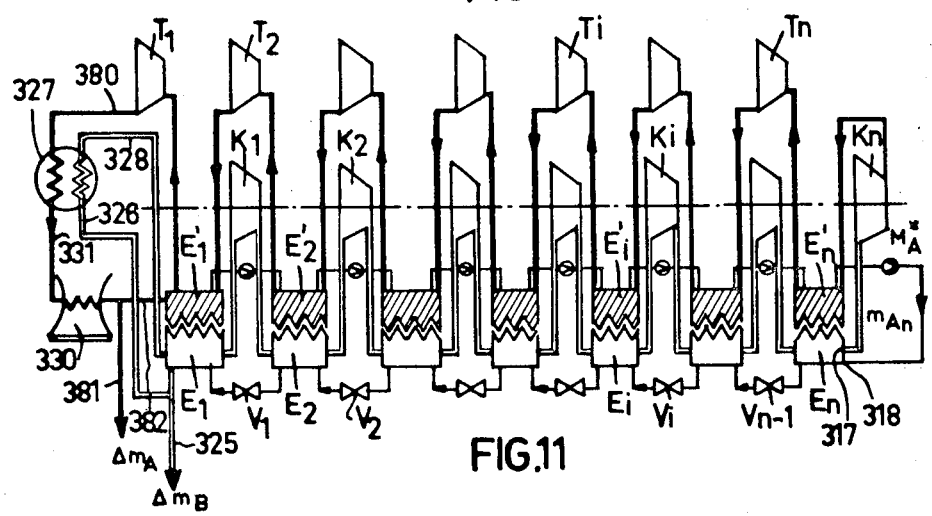
FIG. 11 is a complete system for the embodiment of a principal process with pressure and temperature increasing and of an associated turbine process.

In order to facilitate the representation, in FIG. 9 the principal polytropic machine operating according to the invention with the mixture A+B as the working fluid, is shown; in FIG. 10 the associated polytropic machine, operating with the fluid A alone as the working fluid is shown; and in FIG. 11 the combination of these two machines, which is the polytropic system effecting the process of type $ZZ_2$, is shown.

It is not necessary to describe in detail the machine of FIG. 9, which is of the general type conforming to the schematic representation of FIG. 3. Concerning the configuration proper of such a machine, a person skilled in the art might want to refer to the patents mentioned in the introduction of the present description, should this be necessary. The machine is of the compressor sequence type, cooled, and thus comprises a certain number of stages or cells of exchange, $E_1, E_2, —E_i—E_n$, communicating with each other both in the liquid and the vapor phase. The working fluid is the binary mixture A+B. Temperatures and the pressure are rising from the first stage $E_1$ to the last stage $E_n$. The compressors $K_1, K_2—K_i—K_n$ are connected to each stage as shown in FIG. 9 and the vapor flow of the binary mixture A+B circulates in this series of compressors. The individual liquid flows pass from stage to stage with the interposition of a flash throttle valve $V_1, V_2—V_{n-1}$.

At $F_1, F_2,—F_i—F_n$, the exchange bundles are shown schematically; according to the invention, they belong to the associate machine (FIG. 10).

Overall, a vapor flow equal to $m_{B1}$ of the fluid B enters into the compressor $K_1$ of the first $E_1$. From the first stage $E_1$ a liquid flow $M^*_B$ of the fluid B exists, with $M^*_B = m_{B1} + \Delta m_B$, as has been explained hereinabove.

At the level of the last stage $E_n$, a vapor flow of the component A equal to $M^*_A$, with $M^*_A = m_{An} + \Delta m_A$, leaves the compressor $K_n$ and A in the liquid state, a flow $m_{An}$ enters.

In FIG. 10, an associated polytropic machine which is part of a sequence of cooled turbines, is represented schematically. It comprises a series of stages $E'_1, E'_2—E'_n$ with their corresponding turbines $T_1, T_2—T_i—T_n$. The vapor flow of the component A passes successively into the turbines while being cooled, the flow $M^*_A$ being introduced in the vapor stage into the last turbine $T_n$. Each stage also communicates with the adjacent stages by means of the liquid phase of the component A, as shown schematically by the circuits comprising the throttle flash valves $V'_1, V'_2—V'_i—V'_{n-1}$. A liquid flow equal to $m_{A1}$ enters the first stage $E'_1$ and from the last stage a liquid flow $m_{An}$ issues. A total flow of $m_{A1} + \Delta m_A$ is recovered at the outlet of the first stage.

According to the invention, the polytropic machines of FIGS. 9 and 10 are associated as shown in FIG. 11.

To each stage $E_1, E_2—E_i—E_n$ of the polytropic machine working with compressors and the binary fluid, a stage $E'_1, E'_2—E'_i—E'_n$ of the polytropic machine with turbines corresponds, the latter having the component A as its working fluid.

The effluent of the first turbine is transported through the conduit 380 and an exchanger 327, which has the same function as the exchange 127 of FIG. 7. At the outlet of the exchanger 327, the fluid A, partially condensed, passes into the conduit 331 and then into the atmospheric condenser 330, which has the same function as the condenser 130 in FIG. 7. At the outlet of the condenser 330, the production $\Delta m_A$ is recovered in the conduit 381 and a flow $m_{A1}$ is introduced through the conduit 382 in the first stage $E'_1$. Further, the flow of the components B issuing from the first stage $E_1$ is in part conducted in 325 to furnish the production $\Delta m_B$ and the rest is passed through the conduit 326 into the exchanger 327, where it vaporizes completely prior to being introduced through the conduit 328 into the first stage $E_1$.

At the level of the last stages $E_n, E'_n$, the flow $m_{An}$ of the liquid coming from $E'_n$ is introduced at 318 into $E_n$ and the vapor flow $M^*_A$ coming from $E_n$ at 317, is conducted to the compressor $K_n$.

PATH $ZZ_3$

The principal process is always at rising pressures from the first to the last stage, but in this instance with the temperature decreasing; the associated process here is a compressor process; the condensation process of A receives a vapor flow $m'_A$, carrying the heat rejected by the system, coming from the last stage of the separation process; the production $m_A$ is extracted from the liquid flow coming from the condensation process of A, the rest, $m'_A - \Delta m_A$, is returned to the last stage of the separation process; in its turn, the last stage of the associated process has received the vapor flow of A equal to $m_A + \Delta m_A - m'_A$; the difference between the vapor and liquid flows of A, which is zero at the first stage, is maintained and from the last stage of the associated process a liquid flow A issues, which is also equal to $m_A + \Delta m_A - m'_A$; this flow is conducted to the last stage of the separation process, which receives all of the liquid flow $m_A$.

Figure 12:
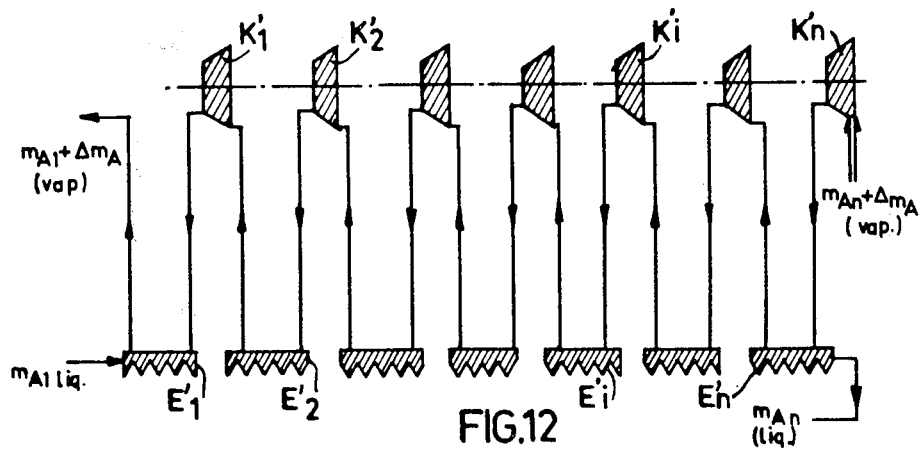
FIG. 12 illustrates the associated polytropic machine used in the system of FIG. 13.
Figure 13:
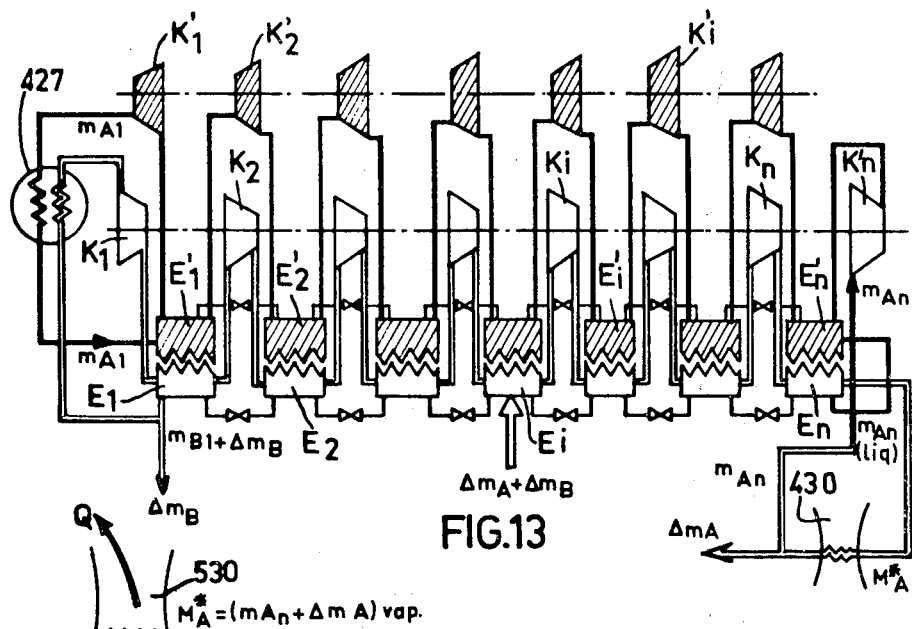
FIG. 13 is a complete system for the embodiment of a principal process at a rising pressure and temperature and an associated compressor process.

In FIG. 12, the diagram of the associated process and in FIG. 13, the polytropic system corresponding to the past $ZZ_3$, are shown. The principal process, which operates with the A+B mixture as the working fluid, is the one shown in FIG. 9. The details of these machines, which are identical with those described hereinabove, will not be repeated here (FIGS. 9 to 11). In all of these drawings, the same references have been used to indicate the elements. It is sufficient for those skilled in the art to see the inputs and outputs of the fluids.

Thus, in FIG. 12, the compressors $K'_1, K'_2—K'_i—K'_n$ are seen in succession; they correspond respectively to the stages $E'_1, E'_2—E'_i—E'_n$. At the level of the first stage $E'_1$, a flow of the liquid component A equal to $m_{A1}$ enters and a vapor flow equal to $m_{A1} + \Delta m_A$ exits. At the level of the last stage, from $E'_n$ a flow $m_{An}$ of the liquid exits and the compressor $K'_n$ is fed by a vapor flow $m_{An} + \Delta m_A$ or $M^*_A$.

FIG. 13 represents a system according to the invention. A polytropic machine of the principal process is seen; it comprises the stages $E_1, E_2—E_i—E_n$ with the compressors $K_1, K_2—K_i—K_n$ and the machine of FIG.

12, which is associated with the respective stages of $E'_1$, $E'_2—E'_i—E'_n$, with the sequence of the compressors $K'_1$, $K'_2—K'_i—K'_n$. FIG. 13 also shows the exchanger 427 and the atmospheric condenser 430. The connections between these elements are shown in the drawings and the latter is an integral part of the description. The inlets and outlets of the fluid are also illustrated in the drawing.

PATH $ZZ_4$

The principal process is at a constant pressure; the associated process is a compressor process; the condensation process of A receives a vapor flow $m'_A$, carrying the reject heat of the system, coming from the last stage of the separation process; the production $m_A$ is extracted from the liquid flow coming from the condensation process of A, the rest, i.e. $m'_A - \Delta m_A$, is returned to the last stage of the separation process, while in its turn, the last stage of the associated process has received the vapor flow of A equal to $m_A + \Delta m_A - m'_A$; the difference of the vapor and liquid flows of A, which is zero in the first stage, is maintained, and from the first stage of the associated process there issues a liquid flow of A which is also equal to $m_A + \Delta m'_A$; this flow is conducted to the last stage of the separation process; the latter thus receives all of the liquid flow $m_A$.

Figure 14:
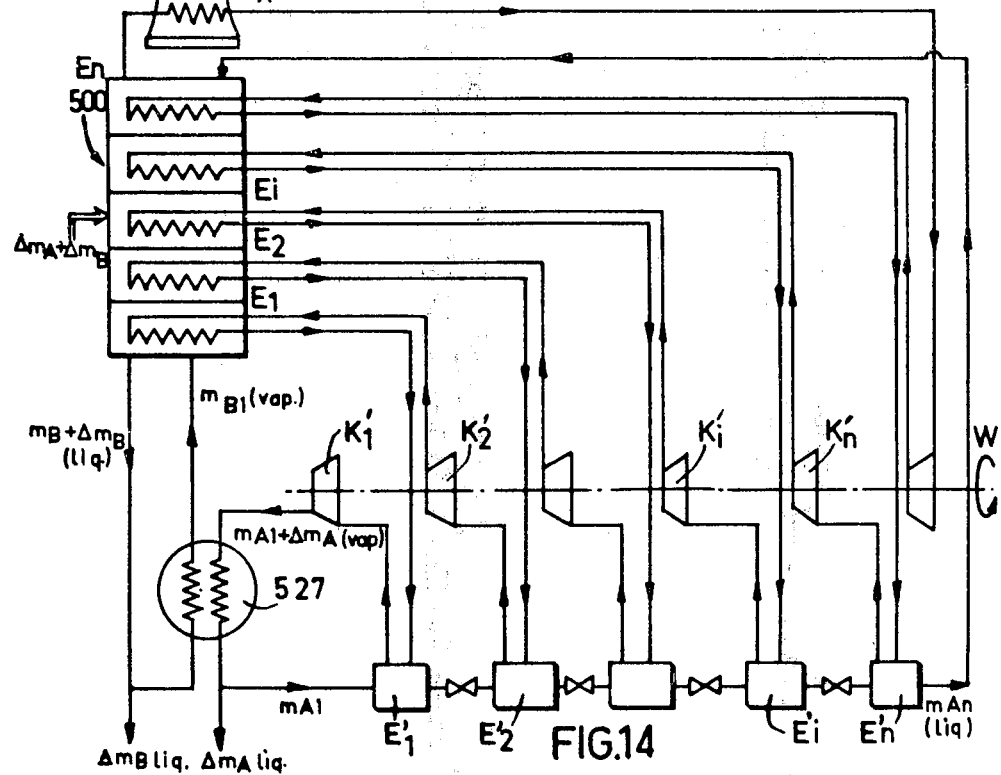
FIG. 14 is a system for the embodiment of a principal process at a constant pressure and an associated compressor process.

The system to effect such a process is shown in FIG. 14. The principal polytropic machine is shown in the form of a distillation column 500 with its stages or plates $E_1$, $E_2—E_i—E_n$. The associated machine is a sequence of compressors, compressing the stages $E'_1$, $E'_2—E'_i—E'_n$; with the compressors $K'_1$, $K'_2—K'_i—K'_n$. The exchanger 527 and the atmospheric condenser 530 are also shown. The drawing clearly shows the inlets, outlets and the circulation of the fluids and it is an integral part of the present description.

PATH $ZZ_5$

The principal process is at decreasing pressures and temperatures, it is a turbine process; the associated process is a compressor process; the condensation process of A receives a vapor flow $m'_A$, carrying the heat rejected by the system, coming from the last stage of the "separation" process; the production $\Delta m_A$ is extracted from the liquid flow issuing from the condensation process of A, the rest, i.e. $m'_A - \Delta m_A$, is returned to the last stage of the separation process; in its turn, the last stage of the associated process has received the vapor flow of A equal to $m_A + \Delta m_A - m'_A$; the difference of the vapor and liquid flows of A, which is zero at the first stage, is maintained, and from the last stage of the associated process a liquid flow of A issues, which also is equal to $m_A + \Delta m_A - m'_A$; this flow is conducted to the last stage of the process of separation; the latter therefore receives the entirety of the liquid flow $m_A$.

Figure 15:
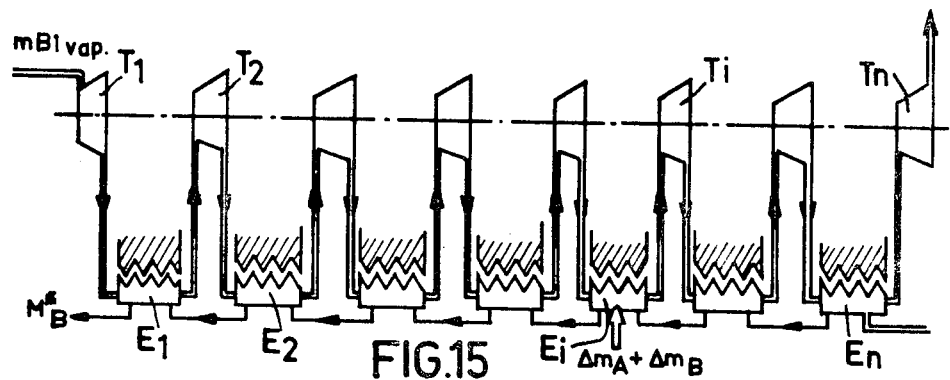
FIG. 15 illustrates the principal polytropic machine used according to the invention in the system of FIG. 17.
Figure 16:
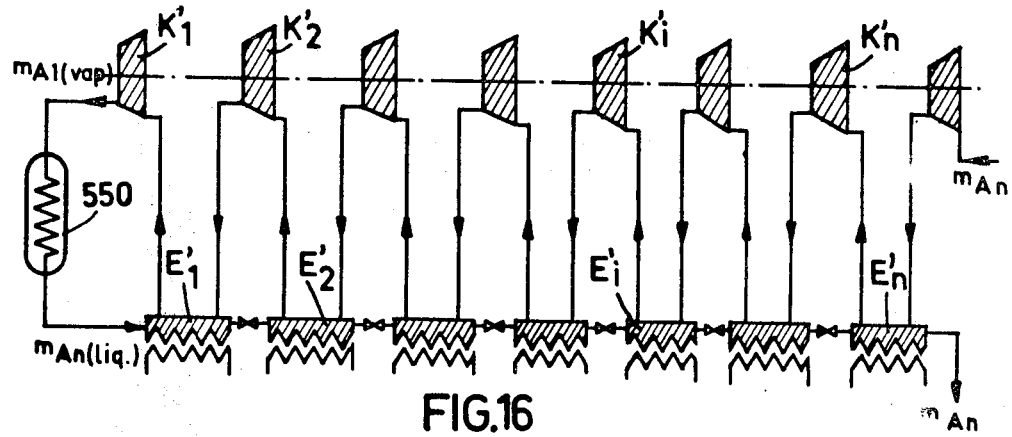
FIG. 16 illustrates the associated polytropic machine used according to the invention in the system of FIG. 17.
Figure 17:
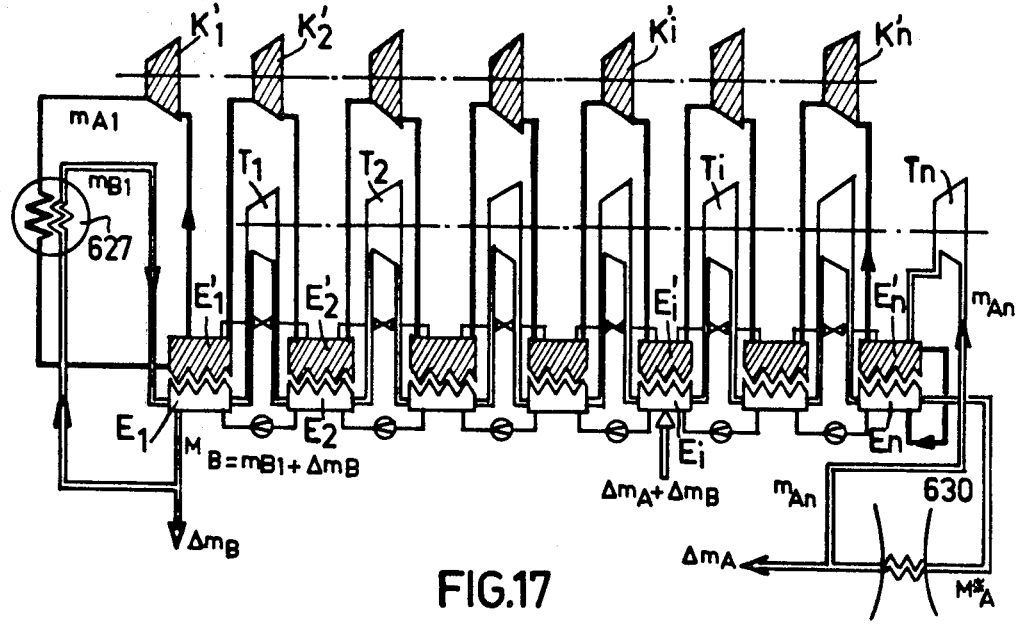
FIG. 17 is a complete system for the embodiment of a principal process at a decreasing pressure and temperature and an associated compressor process.

FIGS. 15 to 17 illustrate such a system.

FIG. 15 shows schematically the principal polytropic machine with its stages $E_1$, $E_2—E_i—E_n$ and the corresponding turbines $T_1$, $T_2—T_i—T_n$.

FIG. 16 shows schematically the associate machine which consists of a series of compressors operating with the A component as the working fluid. The stages $E'_1$, $E'_2—E'_i—E'_n$ with the corresponding compressors $K'_1$, $K'_2—K'_i—K'_n$, are seen. A condenser 550 is also provided, it receives the vapor flow $m_{A1}$ coming from the first compressor $K'_1$ and condenses it completely to form the liquid to be introduced in the first stage $E'_1$.

FIG. 17 represents the combination, according to the invention, of the machines shown individually in FIGS. 15 and 16. The stages $E_1$, $E_2,—E_i—E_n$ are seen with their turbines $T_1$, $T_2—T_i—T_n$, which are associated, respectively with the stages $E'_1$, $E'_2—E'_i—E'_n$ with their compressors $K'_1$, $K'_2—K'_i—K'_n$. There is also seen the exchanger 627 and the atmospheric condenser 630, the functions whereof have been described hereinabove. The inlets, outlets and circulations of the fluids are seen clearly in FIG. 17, which is an integral part of the present description.

The paths $ZZ_1$ (isothermal), $ZZ_2$, $ZZ_3$, $ZZ_4$ (isobaric) and $ZZ_5$ are the most common in actual practice. However, the invention concerns also more complex processes, the representative paths whereof may comprise maxima, minima or broken lines. Such complex paths may be separated into the individual processes as described hereinabove.

It is also obvious that the discussion presented in the foregoing is with reference to ideal machines operating without loss, in order to facilitate the presentation. In actual practice such losses must be taken into consideration, as it well known to those skilled in the art.

The invention provides a process employing only reversible operations, at least when reference is made to an ideal process only. Application of the first law of thermodynamics to the overall system shows that the work W introduced in equal to the heat rejected Q, $Q = W$.

This work represents the minimum work of separation.

The application of the second law of thermodynamics, with the assumption to be rigorous that the separated products $\Delta m_A$ and $\Delta m_B$ are heated to the temperature of the introduction of the mixture by interchange with the process, so that there is no appreciable flow of heat across the process, results in the fact that there is no flow of entropy through the entirety of the system, because the process is by assumption, reversible. The following relation may thus be written:

$$\Delta S_{mel} - \Delta S_{therm} = 0$$

wherein $\Delta S_{mel}$ is the entropy of the sample mixture $\Delta m_A + \Delta m_B$, and $\Delta S_{ther}$ is such that $Q = T_o \times \Delta S_{ther}$ with $T_o$ = the low level temperature of the process.

Therefore:

$$W = T_o \times \Delta S_{mel}$$

$\Delta S_{mel}$ being a value attached to the product to be separated, the above relation indicates that the works of the above described processes differ among themselves by the temperature of rejection $T_o$.

All of the above presented considerations apply to the cases wherein the liquid-vapor equilibrium curves are those of mixtures essentially obeying the laws of ideal solutions; these are families of curves similar to those in FIG. 1. For example, when one is moving on the diagram from Z to $Z_1$ (FIG. 2), the pressure is rising.

When, as shown in FIG. 18, the equilibrium curves present a minimum, such as Z' (the case of an azeotropic mixture), the path $Z_oZ'_1$ comprises two parts.

Path $Z_oZ'$ remains at rising pressures.

Path $Z'Z'_1$ is at decreasing pressures.

The system to effect such a process, resulting from the combination of two individual processes, may consist of a first process with a series of compressors, such as those shown in FIG. 9, and a second process with a series of turbines, such as those shown in FIG. 15, the two processes operating with the binary mixture A+B as the working fluid.

The point of introduction of the mixture may be located anywhere in relation to the point of bridging of the two processes. For example, it may be located (FIG. 19) in the series of compressors.

FIG. 19 is a schematic example of the machine operating according to the path $Z_oZ'Z'_1$. The first process, with the series of compressors, is represented by the block 700 and the second, with the series of turbines, by the block 701. The joining interface of the two processes is illustrated by the line X-Y. The mixture of $m_A+m_B$ is introduced at the stage $E_i$ of the process 700. Overall, the depletion module is represented by 702 and the rectification module by 703.

In order to render the operation of the system stable, a clear discontinuity of concentrations may be created in A, between the last stage of the process 700 and the first stage of the process 701, by injecting in the latter a small flow of the pure component A.

It is obvious that the invention is not limited by the preceding description and that numerous variants may be effected without exceeding the scope of the invention. Polytropic processes were illustrated by examples. But the invention concerns polytropic processes for the rectification of the greatest variety of binary mixtures, such as the mixtures of water and liquid organic compounds, for example methanol and mixtures of hydrocarbons.

PRACTICAL APPLICATION OF AN ISOBARIC PROCESS

In the description to follow hereinafter, the practical application of a system of the type shown in FIG. 14, i.e. an isobaric process, is illustrated. To facilitate the description, FIG. 14 is shown in another form and the system is demonstrated in FIG. 20. In the figure, side by side the rectification column (principal process) and the associated process (PAC) are shown. The column and the PAC are graduated from top to bottom; two points at the same heights are at the same temperature. The drawing of FIG. 20 is an integral part of the present description and therein are found the fluid circulations and the characterization of the above described thermodynamic values. All of these notions are readily accessible to those skilled in the art and do not require complementary development.

In order to make the operation correspond completely to the ideal scheme, the pure, liquid components A and B exit at temperature T* at which they have entered the state of mixture.

In the drawing the vapor flows are designated by the exponent v and the liquid flows by the exponent l. On top of the column, the vapor flow of A, or $m_A+\Delta m_A$, is withdrawn. The flow $\delta m_A$ if the one with its latent heat corresponding to the reject heat. It must therefore be condensed at the top of the column. Calculations are thereby simplified. The result is the general organization of flows appearing in FIG. 20.

The relationship expressing that the entropy flux across the column is zero (because its operation is reversible) may be written as:

$$(m_a+\Delta m_A)S''_A(T) - m_A S'_A(T)$$
$$-(\Delta m_A - \delta m_A)S'_A(T) + (\Delta m_A - \delta m_A)$$
$$S'_A(T^*) + \Delta m_B S'_B(T^*) - \Delta m_A S'_A$$
$$(T^*) - \Delta m_B S'_B(T^*) - \Delta S^* + (m_B + \Delta m_B)S'_B$$
$$(T) - \Delta m_B S'_B(T) - m_B S''_B(T) + \Delta S_{th} = 0.$$

The following relationship is obtained by applying the second law of thermodynamics (1):

$$|m_A^{(+)} + \Delta m_A| \frac{L_A(T)}{T} + \delta m_A C_{1A} \log\left(\frac{T}{T^*}\right) - m_B \frac{L_B(T)}{T} + \Delta S_{th} - \Delta S^* = 0 \quad (1)$$

wherein $\Delta S^*$ is the entropy flux of the mixture, $\Delta S_{th}$ is the entropy flux originating in reversible exchanges of heat.

According to the first law of thermodynamics, the enthalpy balance over the column is expressed by the following relationship (2):

$$|m^{(+)}_A + \Delta m_A| L_A(T) - \delta m_A C_{1A}(T^* - T) - m_B L_B(T) + Q_1 = 0 \quad (2)$$

For the PAC, the second law is expressed by the relationship (3):

$$-|m_A^{(+)} + \delta m_A| \frac{L_A(T)}{T} + M'_A \frac{L_A(T)}{T'} + \delta m_A C_{1A} \log \frac{(T^*)}{T'} - \Delta S_{th} = 0 \quad (3)$$

The first law, written for the PAC, reads:

$$-|m_A^{(T)} + \delta m_A| L_A(T) + M'_A L_A(T) + \delta m_A C_{1A}|T^* - T'| - Q_1 - W = 0 \quad (4)$$

By combining the relations (1) and (3) on the one hand and (2) and (4) on the other, the following two equations are obtained:

$$W = |\Delta m_A - \delta m_A| L_A(T) = T \Delta S^*$$

Finally, the heats exchanged in the condenser follow the following equation:

$$M'_A L_A(T) = m_B L_B(T)$$

Since the relations of the concentrations at equilibrium (xA(T), yA(T), etc.—) as a function of T are known, the following may be derived:

in the rectification module:

$$m_A = \Delta m_A x_A \frac{1 - y_A}{y_A - x_A}$$

$$M_A = \Delta m_A \frac{y_A(1 - x_A)}{y_A - x_A}$$

$$m_B = m_A\left(\frac{1 - x_A}{x_A}\right)$$

in the depletion module:

$$m_B = m_B y_B \frac{1 - x_B}{x_B - y_B}$$

$$M_B = m_B \frac{x_B(1 - y_B)}{x_B - y_B}$$

$$m_A = \frac{y_A}{1 - y_A} m_B$$

The entirety of the equations presented hereinabove thus make it possible to determine the work of separation, i.e. the work required to separate the components A and B of the mixture, when using the means of the invention.

Still within the application of an isobaric process, actual indications of the calculation of the number of stages in the column, in view of a practical application, will now be given.

Figure 21:
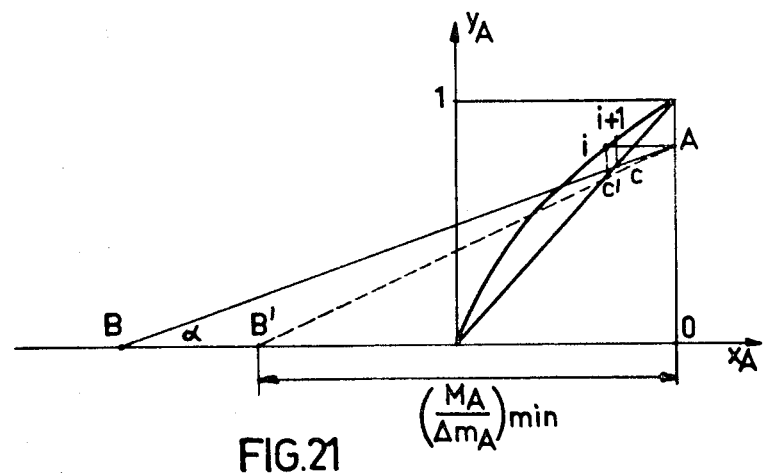
FIG. 21 illustrates a geometric design to determine the number of stages of a rectifying column designed in keeping with the invention.

In FIG. 21, a geometric design facilitating such a determination, is shown. Initially, the abovementioned equation (a) should be recalled; it is applicable to the rectification module between two successive stages of the order of $i$ and $i+1$.

$$\frac{M_A}{m_A} = \frac{y_{Ai}(1 - x_{Ai+1})}{y_{Ai} - x_{Ai} + 1} \quad (a)$$

This equation may also be written as $$\frac{y_{Ai} - x_{Ai+1}}{1 - x_{Ai+1}} = \frac{y_{Ai}}{OB} = \text{tg } \alpha \quad (a')$$

As shown by the diagram in FIG. 21, the construction of the point $i+1$ from the point $i$ is as follows:
a horizontal line is drawn through $i$ to determine the point A,
the length, freely chosen, of $OB = M_A/\Delta m_A$, is marked off,
A and B are connected to determine the point C from which one ascends to $i+1$.

Means to determine graphically the ratio of $$\left(\frac{M_A}{\Delta m_A}\right)$$

mini that would be obtained with an infinite number of plates, are derived.

Beginning with $$\left(\frac{M_A}{\Delta m_A}\right)$$

mini, the actual $$\left(\frac{M_A}{\Delta m_A}\right)$$

may be determined, for example by writing:

$$\left(\frac{M_A}{\Delta m_A}\right) \text{ actual} = (1 + K) \times \left(\frac{M_A}{\Delta m_A}\right) \text{ mini } (K > 0)$$

By maintaining K constant in the construction of $i+1$ as a closer and closer function of $i$, it is possible by means of several successive constructions, to establish a relationship between K and the number of plates. The useful number of plates may thus be determined.

In the depletion module, the following relationship is valid:

$$\frac{m_B}{\Delta m_B} = y_{Bi} \frac{1 - x_{Bi} + 1}{x_{Bi+1} - y_{Bi}}$$

$$\frac{M_B}{\Delta m_B} = \frac{x_{Bi+1}(1 - y_{Bi})}{x_{Bi+1} y_{Bi}} = \frac{y_{Ai}(1 - x_{Ai+1})}{y_{Ai} - x_{Ai+1}}$$

The same expression as before is thus obtained.

To construct the points representative of the successive stages, the same method is used, but with $$OB = \frac{M_B}{\Delta m_B}$$

The considerations and calculations presented hereinabove were applied to the separation to two closely related substances, propane and isobutane and to the case of the separation of two substances chemically far removed from each other, water and methanol.

EXAMPLE 1

Separation of propane and isobutane (isobaric processes)

The example chosen is that of the mixture of:
1 kg propane + 1 kg isobutane, liquid at 40° C.
Propane is the component A and isobutane is the component B.

Flows are calculated from the liquid-vapor equilibrium curves for p = 10 bars.

Figures 22A, 22B:
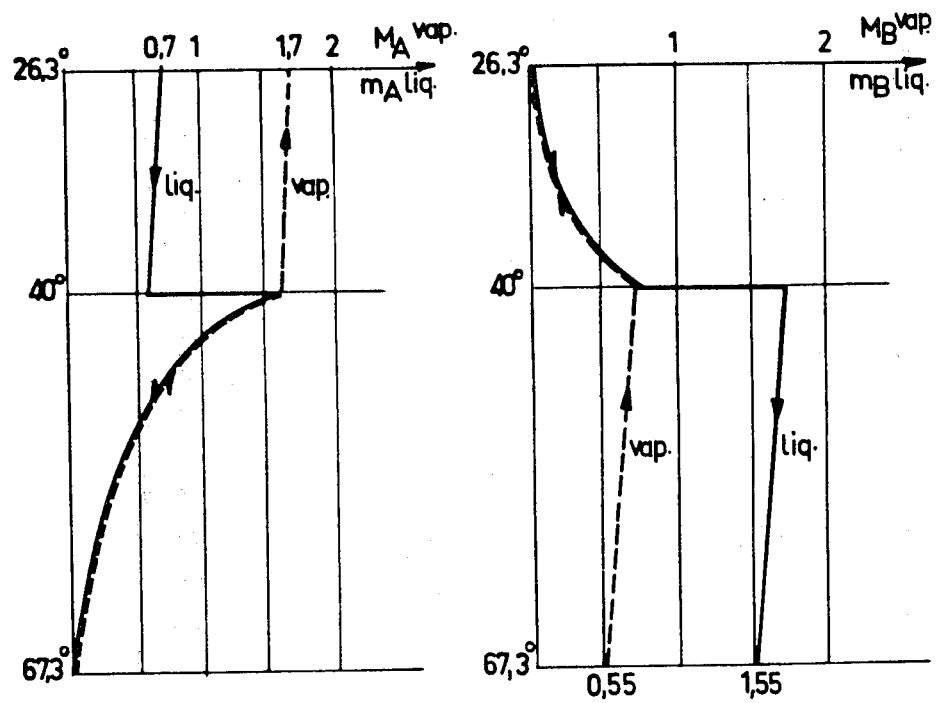
FIGS. 22a and 22b are graphics established for isobutane and propane with an isobaric principal process.

The flows are represented in FIGS. 22a, 22b respectively for the components A and B.

In FIG. 22a, the liquid flow of A may be followed from the top of the column: the reflux $m_A = 0.7$ is returned; a small part vaporizes between 26.3° C. and 40° C.; the flow passes at 0.66; it is then reinforced a 1 kg of the charge (1.66); while being vaporized completely at from 40° C. to 67.3° C., it passes at 0; in the inverse direction, the vapor flow passes from 0 to 67.3° C., attains 1.66 at 40° C., and 1.7 at 26.3° C.

In FIG. 22b, the reflux of B in the vapor stage, is emitted at the bottom of the column, 67.3° C. from 67.3° C. to 40° C., it is supplied by a small vaporization of the liquid, which descends; it attains 0.66 at 40° C., then decreases to 0 at 26.3° C.; in the inverse direction, the liquid phase is formed from 26.3° C. to 40° C., passing from 0 to 0.66 at 40° C., where it is reinforced by one unit of the charge (1.66); it then slightly decreases to attain 1.55 at the foot of the column.

In the knowledge of the evolution of the flows, the heat exchanged along the column may now be calculated, by integrating section by section, according to Equation (5)

$$Q_{cd} = \int_T^T \left| \frac{dm_A}{dT} L_A(T) + \frac{dm_B}{dT} L_B(T) + m_A(C'_A - C''_A) - m_B(C'_B - C''_B) \right| dT$$

together with the flux of entropy passing from the PAC to the column, according to Equation (6).

$$\Delta S_{th} = \int_{T}^{T} \left| \frac{dm_A}{dT} \cdot \frac{L_A(T)}{T} + \frac{dm_B}{dT} \cdot \frac{L_B(T)}{T} + \frac{m_A(C_A - C'_A) - m_B(C_B - C'_B)}{T} \right| dT$$

Taking $Q_{col}$ in (2), $\delta m_A$ is determined, then taking $\delta m_A$ and $\Delta S_{th}$ in (3), $M'_A$ is determined; finally by inserting $\delta m_A$, $M'_A$ and $Q_{col}$ in (4), the work w is obtained.

The following numerical values are obtained for the principal entities:

| | | |
|---|---|---|
| $M_A$ (26.3° C.) | = | 1.7 kg/s (flow exiting on top) |
| $M_A L_A$ (26.3° C.) | = | 497 kW (latent heat) |
| $m_A$ (26.3° C.) | = | 0.7 kg/s (reflux) |
| $M'_A$ (67.3° C.) | = | 0.64 kg/s |
| $M_B$ (67,3° C.) | = | 0.56 kg/s (reflux) |
| $m_B L_B$ (67.3° C.) | = | 143 kW (latent heat) |
| $Q_{col}$ | = | 400 kW. |
| The work of separation W is | | |
| W | = | 46 kW |

The ratio $Q/W$, Q being the heat supplied by the PAC to the assembly of the depletion module+boiler of B″, is designated by the abbreviation CoP. The following is found:

| | | |
|---|---|---|
| CoP | = | 750/46:16.3 |

EXAMPLE 2

Separation of methanol and water (isobaric process)

The example chosen is that of the mixture: 0.1 kg methanol (component A)+0.9 kg water (component B), liquid, at 92° C.

Flows are calculated from the liquid-vapor equilibrium curve and are shown respectively, in FIG. 23a and 23b.

Calculations are effected as in Example 1.
The following values are found:

| | |
|---|---|
| $M_A$ (64.5° C.) | = 0.142 kg/s (flow exiting on top) |
| $M_A L_A$ (64.5° C.) | = 159 kW (latent heat) |
| $m_A$ (64.5° C.) | = 0.042 kg/s (reflux) |
| $M'_A$ (100° C.) | = 0.236 kg/s |
| $M_B$ (100° C.) | = 0.108 kg/s (reflux) |
| $m_B L_B$ (100° C.) | = 244 kW (latent heat) |
| $Q_{col}$ | = −54.4 kW |
| W | = 27 kW (work of separation) |
| COP: 476/27 | = 17.6 |

PRACTICAL APPLICATION OF AN ISOTHERMAL PROCESS

The process employed is of the general type represented in FIG. 4.

From the equilibrium curves, the vapor and liquid flows of A and B are calculated by the following equations:

in the rectification module:

$$m_A = \Delta m_A \frac{x_A(1 - y_A)}{y_A - x_A}$$

$$m_B = m_A \left( \frac{1}{y_A} - 1 \right)$$

in the depletion module:

$$m_B = \frac{\Delta m_B \, x_A(1 - y_A)}{y_A - x_A}$$

$$m_A = m_B \frac{y_A}{1 - y_A}$$

the total work of the compressors is expressed by $$W_{comp} = \int_{P_o}^{P_1} \left[ m_A^{vap} \frac{dF_A}{F_A} + m_B^{vap} \frac{dF_B}{F_B} \right]$$

EXAMPLE 3

Separation of Butane and Propane

| | |
|---|---|
| Propane | = component A |
| Butane | = component B |

The temperature of the machine is 40° C., the extreme pressures are:

| | |
|---|---|
| for $x_A = 0$ | 5.25 bars |
| for $x_A = 1$ | 13.92 bars |

The pressure of the introductory stage ($x_A = 0.5$) is p = 10 bars.

Flows are calculated from equilibrium curves. Results are compiled in FIG. 24a and 24b, which are part of the description.

Calculation of the work yields:

| |
|---|
| W = 42 kW. |

EXAMPLE 4

Separation of Methanol and Water

| | |
|---|---|
| Methanol: | component A |
| Water: | component B |
| Composition: | $x_A = 0.1, x_B = 0.9$ |

Extreme pressures are:

| | |
|---|---|
| $x_A = 0$ | $P_o = 0.4738$ bar |
| $x_A = 1$ | $P_1 = 1.696$ bar |
| $P_1/P_o = 3.6$ | | pressure at the introductory stage P = 0.65 bar.

Figure 25B:
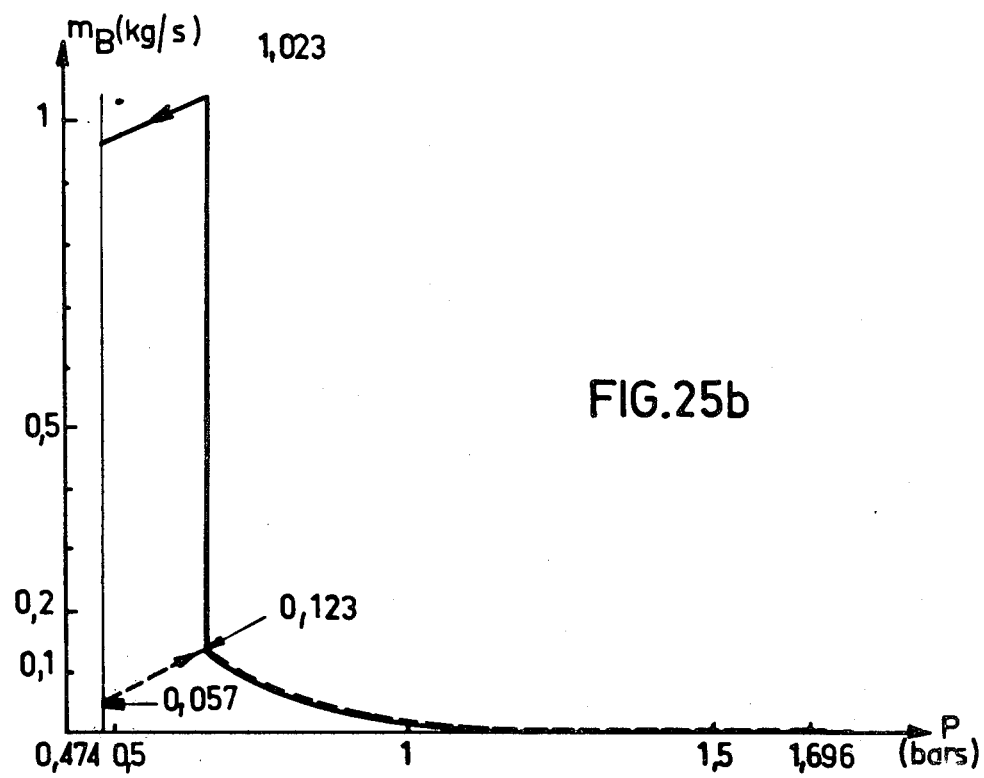

The flows of methanol ($m_A$) and of water ($m_B$) evolve as indicated in FIG. 25a and 25b, which are part of the description.

The value of work is W = 25 kW.

CALCULATIONS OF A CONVENTIONAL COLUMN (COMPARISON)

Figure 26:
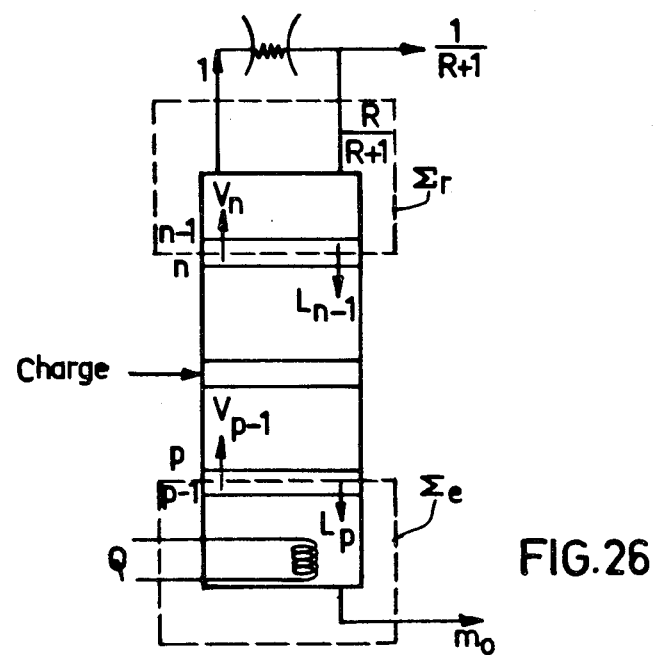
FIG. 26 is a diagram illustrating the enthalpic method of calculating a conventional rectification column.

The calculations were effected by assuming that the number of plates is infinite and that the products A and B are extracted in the pure state. The diagram in FIG. 26 illustrates the notations used. Molar values are used, with respect to the case where 1 mole per second issues at the top of the column. The notation adopted is as follows:

$\frac{1}{R+1}$ = effluent at the top of the column $\frac{R}{R+1}$ = liquid retrogradation at the top of the column $L_{n-1}$ = liquid retrogradation flowing from the plate of rank $n-1$ $V_n$ = vapor flows ascending from the plate of rank $n$ $m_o$ = removal of liquid at the bottom of the column By writing the material balances and the heat balance, respectively for $\Sigma r$ (rectification module) and $\Sigma e$ (depletion module), the following relationships are obtained:

$$\frac{y_n - 1}{x_{n-1} - 1} = \frac{H_n - P}{h_{n-1} - P} = \frac{L_{n-1}}{V_n}$$

$$\frac{x_p}{y_p} = \frac{h_p - P_o}{H_{p-1} - P_1} = \frac{V_{p-1}}{L_p}$$

APPLICATION OF THE PROPANE-BUTANE SAMPLE

The butane-propane mixture is introduced in the column at 40° C.

For this temperature, the liquid-vapor equilibrium curve yields the following values:

$x_A = 0.55$ and $y_A = 0.752$

These values make possible the calculation of the enthalpies at the level of the feed plate:

$h_{al} = 1.75$ kW; $H_{al} = 16.28$ kW

By plotting the points ($x_A$, $h_{al}$) and ($y_A$, $H_{al}$) on a diagram and drawing the straight line which connects them with each other, the following may be read on the ordinate:

$P = 34$ kW and $P_o = -38$ kW

From the value of P:

$\frac{1}{R+1} = 0.433$ which is the mole fraction of A extracted at the top of the column. The $m_o$ moles of B extracted at the bottom of the column have the same mass as 0.433 mole of A, therefore:

$m_o = 0.328$

In the knowledge of the values of $m_o$, $P_o$ and the enthalpy $h_o$ of the liquid at the bottom of the column, the quantity of the heat supplied to the reboiler may be calculated:

$Q = 14.43$ kW for a charge of 19.1 g of A and 19.1 g of B. If the charge introduced per second in the column comprises 1 kg of propane and 1 kg of butane, the heat Q furnished to the reboiler is $Q = 756$ kW

APPLICATION TO THE METHANOL-WATER SAMPLE

With the charge introduced at a temperature of 92.2° C., the vapor-liquid equilibrium curve yields the values of:

$x_A = 0.06$ and $y_A = 0.324$

At the level of the feed plate, the enthalpies have the values of:

$h_{al} = 2.11$ kW and $H_{al} = 40.55$ kW

Following the procedure of the preceding example yields:

$\frac{1}{R+1} = 0.253$ and $m_o = 4.05$ $Q = 465.6$ kW which is the heat to be supplied to the reboiler for a charge introduced to the column per second, comprising 0.1 kg methanol and 0.9 kg water.

The results of the abovementioned calculation are compiled in the table hereinafter:

|  |  | Propane i-butane | Methanol water |
|---|---|---|---|
| Incident heat of mixture |  | 40° C. | 92.3° C. |
| Conventional column heat supplied (kW) |  | 756 | 465.6 |
| PAC POL* in assistance to the conventional column | $W_{meca}$ (kW) | 91.1 | 44.4 |
|  | COP | 8.3 | 10.5 |
| $W_{meca}$ reversible (for isothermal or isobaric process) |  | 46 | 27 |
| COP of PAC POL* with polytropic column (isobaric process) |  | 16.3 | 17.6 |

*PAC POL = polytropic system wherein the vapor circulates in the direction of rising temperatures and wherein the difference of the vapor and liquid flows is zero.

According to the invention, the respective COP are:

| propane-isobutane | COP = 5 |
|---|---|
| methanol-water | COP = 6.5 |

With respect to rectification in a conventional column, for which heat equivalent to 10 kW is supplied to the boiler, rectification by conventional column, combined with a conventional heat pump, requires the supply of mechanical work of 4 kW. According to the invention, rectification in a conventional column combined with a PAC POL consumes 2 kW, while rectification by a polytropic column combined with a PAC POL consumes only 1 kW. The advantages of the invention are thus clearly apparent.

Among the polytropic processes according to the invention, preference is given to those employing the lowest number of mechanical components. From this point of view, the preferred processes are the isobaric and isothermal processes described in detail hereinabove. The isobaric system may contain a higher number of plates, but it is not necessary to provide an exchanger per plate. It is possible to establish groups of plates and combine a single exchanger with them, so that there will be fewer exchangers along the column than plates.

In the case of the isothermal process, a compressor must be provided per plate.

If the substances to be separated are far removed from each other from a chemical standpoint, such a process may be advantageous, because the number of plates is low. Furthermore, the temperature of the mixture should not be modified during rectification, which may be important in the case of substances sensitive to temperature.

In a general manner, it is emphasized that the invention, to obtain the same results as a conventional rectification process, employs a column containing fewer plates than the known method. Furthermore, to produce A and B in identical quantities, the invention makes it possible to use a column with a smaller diameter.

Over all, the column according to the invention is thinner and contains fewer plates than the conventional rectifying columns.

It will be apparent to those skilled in the art that the present invention offers numerous possibilities concerning the rectification of binary mixtures.

What is claimed is:

1. In a process for the rectification of a liquid mixture comprised of components A and B which are liquid at ambient conditions, component A being more volatile than component B, wherein said mixture is fed to the intermediate stage of a rectification column comprising in sequence a depletion stage, an intermediate stage, and a rectification stage, a vapor stream and a liquid stream passing between said stages in a countercurrent manner with said vapor steam moving in a direction from said depletion stage toward said rectification stage and said liquid stream moving in a direction from said rectification stage toward said depletion stage, said vapor and liquid being in equilibrium in each stage, component A being recovered as a vapor from said rectification stage and component B being recovered as a liquid from said depletion stage, the temperature-pressure relationship in the column being such that substantially pure component A vapor is present in the rectification stage and substantially pure component B liquid is present in the depletion stage, the improvement whereby the thermodynamic efficiency of the rectification process is increased comprising:

(a) compressing said recovered component A vapor stream to provide a first compressed component A vapor stream;

(b) passing said first compressed component A vapor stream together with a second compressed component A vapor stream from step (g) in an indirect heat exchange relationship with said depletion stage to partially condense said component A vapor stream and supply heat to said depletion stage;

(c) recovering a portion of said condensed component A as product;

(d) recovering a portion of said component B liquid stream as product;

(e) passing the non-condensed portion of said component A vapor stream in indirect heat exchange relationship with the remainder of said component B liquid stream not recovered as product in step (d) to vaporize said component B liquid stream and recycling said vaporized component B stream to said depletion stage;

(f) passing at least a portion of said condensed portion of component A to said rectification stage as a reflux stream;

(g) cooling at least another portion of said condensed portion of component A by passing the same through expansion means and passing it in indirect heat exchange relationship with said rectification stage to vaporize said condensed portion of component A; and (h) compressing said vaporized portion of component A from step (g) and combining it with said compressed portion of component A from step (a).

2. The process of claim 1 wherein said depletion stage and said rectification stage each comprise multiple zones.

3. The process of claim 1 wherein said vapor stream which passes between said depletion, intermediate and rectification stages in a countercurrent manner to said liquid stream is compressed as it moves from stage to stage such that said vapor increases in pressure as it moves from the depletion stage toward the rectification stage.

4. The process of claim 1 wherein said liquid mixture which is comprised of components A and B contains X amount of component A and Y amount of component B, said X amount of component A being recovered as product as a condensate and said Y amount of component B being recovered as product.

5. The process of claim 1 wherein said liquid stream which passes between said depletion, intermediate and rectification stages in a countercurrent manner to said vapor stream decreases in pressure as it moves from stage to stage from the rectification stage toward the depletion stage.

* * * * *